| United States Patent [19] | [11] | 4,353,814 |
|---|---|---|
| Pellet et al. | [45] | Oct. 12, 1982 |

[54] REFORMING WITH AN IMPROVED PLATINUM-CONTAINING CATALYST

[75] Inventors: Regis J. Pellet, Wheaton, Ill.; Ralph J. Bertolacini, Chesterton, Ind.; Donna L. Lysholm, Lisle, Ill.

[73] Assignee: Standard Oil Company (Indiana), Chicago, Ill.

[21] Appl. No.: 108,177

[22] Filed: Dec. 28, 1979

[51] Int. Cl.$^3$ .......................... B01J 27/06; B01J 27/10
[52] U.S. Cl. .................................. 252/441; 208/139; 252/442
[58] Field of Search ................................ 252/401, 442

[56] References Cited

U.S. PATENT DOCUMENTS

| 2,911,375 | 11/1959 | Coley et al. | 252/441 X |
| 3,799,867 | 3/1974 | Caldwell et al. | 252/441 X |
| 3,943,050 | 3/1976 | Bertolacini et al. | 252/442 X |

FOREIGN PATENT DOCUMENTS 2627822  2/1977  Fed. Rep. of Germany .

*Primary Examiner*—Patrick Garvin
*Attorney, Agent, or Firm*—James L. Wilson; William T. McClain; William H. Magidson

[57] ABSTRACT

There is disclosed a catalyst, which catalyst comprises a physical particle-form mixture of a Component A and a Component B, said Component A comprising one or more Group VIII noble metals and a combined halogen deposed on a refractory inorganic oxide and said Component B comprising a metal from Group IVB or Group VB of the Periodic Table of Elements and a combined halogen deposed on a refractory inorganic oxide. Such catalyst is suitable for use in a hydrocarbon conversion reaction zone.

The catalyst can be employed in a process for the reforming of a hydrocarbon stream, which process comprises contacting said stream in a reaction zone under reforming conditions and in the presence of hydrogen with said catalyst. The catalyst is not presulfided. A preferred process comprises contacting a hydrocarbon stream that contains a substantial amount of sulfur.

18 Claims, 9 Drawing Figures

CATALYST C PERFORMANCE AND CATALYST D PERFORMANCE WITH HIGH-SULFUR FEED

REFORMING WITH AN IMPROVED PLATINUM-CONTAINING CATALYST

BACKGROUND OF THE INVENTION

This invention is related to the conversion of hydrocarbon streams. More particularly, it is related to the reforming of hydrocarbon fractions over catalysts comprising physical particle-form mixtures of two components, one of which contains one or more Group VIII noble metals and the other of which contains a metal of Group IVB or a metal of Group VB of the Periodic Table of Elements.

The reforming of hydrocarbon streams is one of the important petroleum refining processes that may be employed to provide high-octane-number hydrocarbon blending components for gasoline. In the typical reforming process, the reactions comprise dehydrogenation reactions, isomerization reactions, and hydrocracking reactions. The dehydrogenation reactions include the dehydrogenation of cyclohexanes to aromatics, the dehydroisomerization of alkylcyclopentanes to aromatics, the dehydrogenation of paraffins to olefins, and the dehydrocyclization of paraffins and olefins to aromatics. The isomerization reactions include isomerization of n-paraffins to isoparaffins, the hydroisomerization of olefins to isoparaffins, the isomerization of alkylcyclopentanes to cyclohexanes, and the isomerization of substituted aromatics. The hydrocracking reactions include hydrocracking of paraffins and hydrodesulfurization. Adequate discussion of the reactions occurring in a reforming reaction zone are presented in CATALYSIS, Vol. VI, P. H. Emmett, editor, Reinhold Publishing Corporation, 1958, pages 497–498, and PETROLEUM PROCESSING, R. J. Hengstebeck, McGraw-Hill Book Company, Inc., 1959, pages 179–184.

It is well known by those skilled in the art that several catalysts are capable of reforming naphthas and hydrocarbons that boil in the gasoline boiling range. Although reforming can be carried out through the use of several types of catalysts, namely, molybdena-on-alumina catalysts, chromium-oxides-on-alumina catalysts, platinum-halogen-on-alumina catalysts, platinum-rhenium-halogen-on-alumina catalysts, and platinum-aluminosilicate-material-alumina catalysts, the catalysts employing platinum as a hydrogenation component and rhenium as a promoter are generally employed today in the reforming processes of the petroleum industry.

Kluksdahl, in U.S. Pat. No. 3,415,737, discloses the platinum-rhenium catalyst and its use for the reforming of hydrocarbon fractions. He provides that the sulfur content of the system should be minimal and that the catalyst should be presulfided to prevent run-away temperatures due to excessive hydrocracking.

It is known in the art that a reforming catalyst may contain more than one Group VIII metal, for example, platinum and palladium. In U.S. Pat. No. 3,173,856, Burton, et al., teach reforming with a catalyst comprising platinum and/or palladium on eta-alumina. In U.S. Pat. No. 3,554,901, Kominami, et al., teach the aromatization of hydrocarbons at a temperature of 400° C. to 650° C. with a catalyst that is prepared by impregnating a carrier, such as silica, alumina, or silica-alumina, with a solution containing 0.1 to 1 wt % platinum, 0.1 to 1 wt % palladium, and 5 to 25 wt % chromium oxide, and treating the impregnated material with hydrogen. In U.S. Pat. No. 3,694,348, Bursian, et al., disclose the aromatization of hydrocarbons at a temperature of 400° C. to 550° C. and a pressure of up to 20 atmospheres over platinum-on-alumina catalyst containing 0.1 to 5 wt % palladium and 0.1 to 5 wt % of at least one element from the scandium subgroup of Group III of the Periodic Table of Elements and/or the zirconium subgroup of Group IV. In Example 5 of this latter patent, there is employed a catalyst containing 0.6 wt % platinum and 0.2 wt % palladium on alumina.

In U.S. Pat. No. 4,124,490, Collins, et al., teach reforming that employs a catalyst comprising a support, at least one platinum-group metal component, and at least one rhenium component at two different temperature levels. This patent does not provide any examples of a catalyst that contains both platinum and palladium and does not consider the sulfiding of the catalyst to control hydrocracking.

In U.S. Pat. No. 4,124,491, Antos, et al., disclose reforming with a selectively sulfided acidic multi-metallic catalyst comprising one or more Group VIII metals, a sulfided rhenium component, a halogen component, and a Ziegler alumina. The patent teaches that the catalyst may contain platinum, iridium, rhodium, or palladium; platinum and iridium; and platinum and rhodium. It does not provide any catalyst example wherein both platinum and palladium are components of the catalyst. Furthermore, it requires a selective sulfiding of the catalyst.

The use of mechanical mixtures of components for catalysts is well known. Kittrell, in U.S. Pat. No. 3,535,231, considers a process for the conversion of distillates and solvent-deasphalted residua employing a catalyst consisting of a physical mixture of particles of a first catalyst comprising a layered clay-type crystalline aluminosilicate material and a component selected from rhenium and compounds of rhenium and a second catalyst comprising a layered clay-type crystalline aluminosilicate material, a component selected from Group VIII metals and components thereof, and a component selected from a silica-alumina gel, silica-alumina-titania gel, and silica-alumina-zirconia gel. Hydrocracking, hydrodesulfurization, hydrodenitrification, hydrogenation, and hydroisomerization processes are included.

Thorn, et al., in U.S. Pat. No. 2,890,178, disclose a method for preparing a reforming catalyst, wherein an intermediate catalytic concentrate is prepared by impregnating a finely-divided carrier with about 1 to about 35 wt % of a platinum group metal compound, the intermediate concentrate is dried and a major proportion of a finely-divided, predried, adsorptive metal oxide containing a major proportion of alumina and which is free of platinum group metal is mixed with a minor proportion of the concentrate particles.

Sinfelt, et al., in U.S. Pat. No. 3,346,510, disclose a bifunctional catalyst wherein hydrogenation-dehydrogenation metal has been impregnated on a nonacidic component that has been physically mixed with separate particles comprising an acidic component, for example, a catalyst composed of platinum on alumina physically admixed with particles of hydrogen-form, Y-type crystalline aluminosilicate material.

Prater, et al., in U.S. Pat. No. 2,854,404, consider a reforming catalyst that consists essentially of a mechanical mixture of finely-divided particles of a porous inert carrier having deposited thereon a small amount of one or more of the platinum group metals and finely-divided particles of porous eta-alumina having incorporated therein an activating amount of halogen. They consider activated alumina derived from alpha-alumina trihydrate particles which are less than 100 microns in diameter to be a preferred porous inert carrier.

Schwarzenbek, in U.S. Pat. No. 2,897,137, discloses a reforming catalyst comprising a catalyst containing about 1 to about 25 wt % of platinum supported on a carrier material in physical admixture with a carrier material in an amount sufficient to provide an average platinum concentration of about 0.05 to about 0.95 wt % in the total mixture. An example is a mixture of alumina and platinum-on-alumina.

Hass, et al., in U.S. Pat. No. 3,619,127, consider a catalyst that can be used for treating automobile exhaust gases, which catalyst comprises a mechanical mixture of discrete particles, part of which contains platinum metal supported on a suitable support and part of which contains Group VI metal oxides supported on the same or a different support. Supports of alumina and silica-alumina are mentioned.

Sinfelt, et al., in U.S. Pat. No. 3,925,196, disclose a reforming catalyst that comprises alumina and an alumina-supported multi-metallic component comprising one or more Group VIII metals alone or in combination with Group VIIB and/or Group IB metals. In U.S. Pat. No. 3,789,020, the same patentees indicate that the metals are supported on less than about one quarter of the total refractory material to form the supported component and the supported component is admixed with the remaining refractory material. Examples of refractory material are alumina, silica-alumina, crystalline aluminosilicate material, silica-magnesia, and mixtures thereof.

There has now been found an improved catalyst for the reforming of petroleum hydrocarbon streams and a reforming process that employs such catalyst.

SUMMARY OF THE INVENTION

Broadly, according to the present invention, there is provided an improved catalyst for the reforming of a hydrocarbon stream, which catalyst comprises a physical particle form mixture of a Component A and a Component B, said Component A comprising one or more Group VIII noble metals and a combined halogen deposed on a refractory inorganic oxide and said Component B comprising a metal from Group IVB or Group VB of the Periodic Table of Elements and a combined halogen deposed on a refractory inorganic oxide. Furthermore, there is provided a process for the reforming of a hydrocarbon stream, which process comprises contacting said stream under reforming conditions and in the presence of hydrogen with a catalyst which comprises a physical particle form mixture of a Component A and a Component B, said Component A comprising one or more Group VIII noble metals and a combined halogen deposed on a refractory inorganic oxide and said Component B comprising a metal of Group IVB or Group VB of the Periodic Table of Elements and a combined halogen deposed on a refractory inorganic oxide.

The pertinent metal of Group IVB is zirconium and the appropriate metals of Group VB are vanadium, tantalum, and niobium. The amount of such a metal in the catalyst falls within the range of about 0.05 wt % to about 2 wt %, calculated as the element and based upon the total weight of catalyst. Preferably, about 1 wt % of the particular metal is present.

Although the process can be used to reform a hydrocarbon stream that does not contain a substantial amount of sulfur, it can be used advantageously to reform a hydrocarbon stream that contains as much as 50 to 80 ppm of sulfur.

The process of the present invention is superior to a reforming process employing a platinum-rhenium catalyst when reforming a hydrocarbon stream containing a substantial amount of sulfur, e.g., 10 ppm (by wt.) of sulfur,

DESCRIPTION AND PREFERRED EMBODIMENTS

Figure 1:
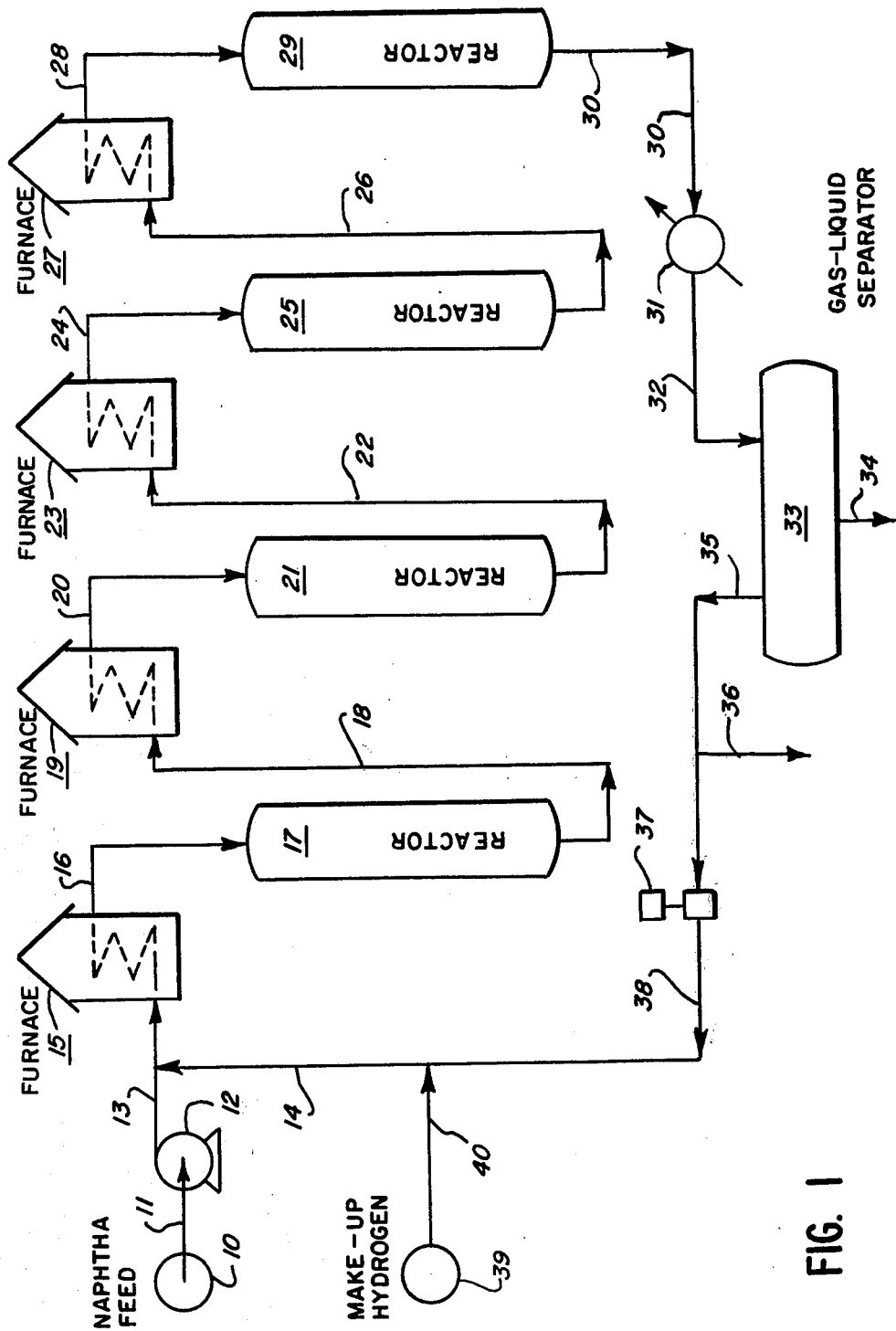
FIG. 1 presents a simplified schematic flow diagram of a preferred embodiment of the process of the present invention, wherein the improved catalyst of the present invention is employed.

The highly mechanized society of today requires an increasing demand for very-high-octane-number motor fuels. One of the chief processes for achieving such motor fuels is the reforming process. Typically, the reforming process of today is a process that employs a catalyst containing both platinum and rhenium as active metal components thereof. Such catalysts provide relatively long catalyst life interspersed with infrequent regenerations. However, there is a disadvantage to the use of a reforming catalyst that contains both platinum and rhenium as active components. This disadvantage is that the catalyst must be carefully sulfided prior to its use in order that excessive hydrocracking does not occur during the first part of the reforming run. Such presulfiding is rather difficult to achieve commercially and often does not provide the expected control of the initial hydrocracking.

The process of the present invention is not hampered by the need for the control of initial hydrocracking at the start-up of the run. The catalyst need not be presulfided; yet detrimental excessive hydrocracking does not occur during the initial stages of the process of the present invention.

The process of the present invention is especially advantageous for the production of high-octane-number blending components for motor fuels by means of the reforming of hydrocarbon streams containing substantial amounts of sulfur. It may be employed suitably to produce high-octane-number blending components for unleaded and/or low-lead motor fuels.

The process of the present invention may be employed to reform a feedstock which is a member selected from the group consisting of a virgin naphtha, a cracked naphtha, a hydrocarbon fraction boiling in the gasoline boiling range, and mixtures thereof. It may also be used to reform partially-reformed naphthas and other hydrocarbon streams. A naphtha will exhibit a boiling range of about 70° F. (21.1° C.) to about 500° F. (260° C.), preferably, about 180° F. (82° C.) to about 400° F. (204° C.). The gasoline boiling range comprises temperatures of about 120° F. (49° C.) to about 420° F. (216° C.), preferably, about 140° F. (60° C.) to about 380° F. (193° C.). The partially-reformed hydrocarbon streams will exhibit an unleaded research octane number within the range of about 75 to about 95. As used herein, the term "partially-reformed" refers to those streams that have been reformed to an unleaded research octane number of about 75 to about 95.

Since many of the above feedstocks may contain appreciable amounts of nitrogen and sulfur compounds, which can be deleterious to the catalyst in a reforming process, such feedstock is often subjected to a suitable hydrodesulfurization and/or hydrodenitrogenation treatment, such as hydrofining, prior to the use of that particular feedstock in the process of the present invention. Such treatment reduces both the nitrogen and sulfur levels to tolerable limits. However, it is to be emphasized that the process of the present invention can be used suitably to reform a hydrocarbon stream that contains a substantial amount of sulfur, i.e., from about 10 ppm of sulfur (by weight) to as much as 50 ppm of sulfur by weight, even up to 80 ppm of sulfur by weight. The process can be used preferably to reform a hydrocarbon stream that contains as much as 35 ppm sulfur by weight.

Broadly, according to the present invention, there is provided an improved catalyst for the reforming of a hydrocarbon stream, which catalyst comprises a physical particle-form mixture of a Component A and a Component B, said Component A comprising one or more Group VIII noble metals and a combined halogen deposed on a refractory inorganic oxide and said Component B comprising a metal of Group IVB or Group VB of the Periodic Table of Elements and a combined halogen deposited on a refractory inorganic oxide.

The catalyst of the present invention comprises two components, namely, Component A and Component B, which are physically admixed with one another. Consequently, the catalyst comprises a physical particle-form mixture, or a mechanical mixture of particles, of the two components.

Component A comprises one or more Group VIII noble metals. Suitable metals are platinum and palladium. Each of these metals, if present in Component A, is present in an amount within the range of about 0.1 wt % to about 2 wt %, calculated as the element and based upon the total catalyst weight. Preferably, each is present in an amount of about 0.3 wt % to about 1 wt %, calculated as the element and based upon the weight of Component A.

Component B comprises a metal of Group IVB of the Periodic Table of Elements or a metal of Group VB of the Periodic Table of Elements. Reference is made to the Periodic Table of Elements that appears on page 628 of WEBSTER'S SEVENTH NEW COLLEGIATE DICTIONARY, G. & C. Merriam Company, Springfield, Mass., U.S.A. (1963). Particular metals that are suitable as components of the catalyst of the present invention are zirconium, vanadium, and tantalum. One of these metals is present in Component B in an amount within the range of about 0.05 wt % to about 2 wt %, calculated as the element and based upon the total catalyst weight. Preferably, the metal is present in an amount within the range of about 0.2 wt % to about 1 wt %, calculated as the element and based upon the total catalyst weight.

Each component of the catalyst of the present invention contains a combined halogen, such as chlorine or fluorine. The preferred combined halogen is chlorine. Component A and Component B can have the same or different combined halogens. Preferably, they have the same halogen. Combined halogen is present in the catalyst in an amount within the range of about 0.1 wt % to about 2 wt %, calculated as the element and based upon the total catalyst weight. Preferably, the combined halogen is present in an amount within the range of about 0.3 wt % to about 1 wt %, calculated as the element and based upon the total catalyst weight. It is contemplated that the amounts of combined halogen on the two components need not be equal; i.e., different amounts of combined halogen can be on the two components of the catalyst of the present invention.

A suitable refractory inorganic oxide that may be employed as the catalyst support material is a catalytically active alumina, such as gamma-alumina, eta-alumina, or mixtures thereof. Such alumina should have an average pore diameter of about 70 Angstrom units [Å] (7 nm) to about 200 Å (20 nm), or larger. The alumina should have a surface area of at least 150 m$^2$/gm. Suitably, the surface area of the alumina should be within the range of about 200 m$^2$/gm to about 800 m$^2$/gm.

The catalyst of the present invention comprises Component A in an amount within the range of about 40 wt % to about 80 wt %, based upon the total catalyst weight. Preferably, it comprises Component A in an amount within the range of about 50 wt % to about 75 wt %, based upon the total catalyst weight.

The catalyst of the present invention can be prepared in various ways that are well known in the art. For example, for either component, soluble compounds of the various metal(s) and the halogen can be added to a sol or gel of the refractory inorganic oxide. This composition is thoroughly blended and the sol or gel mixture is subsequently co-gelled by the addition of a dilute ammonia solution. The resulting co-gelled material is then dried and calcined. In another method of preparation of either component, the refractory inorganic oxide is gelled, dried, pelleted, calcined, and cooled, and the resulting material is then impregnated with one or more solutions of the various metal components and the halogen. Suitable calcination conditions comprise a temperature in the range of about 900° F. (482° C.) to about 1,100° F. (593° C.) and a calcination time of about 1 hour to about 20 hours. Suitable drying conditions comprise a temperature in the range of about 200° F. (93° C.) to about 400° F. (204° C.) and a drying time of about 3 hours to about 30 hours. Preferably, drying conditions comprise a temperature of about 250° F. (121° C.) for about 8 hours to about 16 hours and calcination conditions comprise a temperature of about 1,000° F. (538° C.) for about 2 hours to about 6 hours. The combined halogen may be incorporated into the catalyst as a halide of a metal, or as a halogen acid, or as a halide salt.

A mechanical mixture of particles of Component A and Component B is then prepared. Appropriately sized particles of each component, for example, particles that would pass through a 20-mesh screen (U.S. Sieve Series) but would be retained on a 45-mesh screen (U.S. Sieve Series), are added to one another and are thoroughly blended. This blend can be used as is. A blend of smaller particles of Component A and Component B, for example, particles that will pass through a 100-mesh screen (U.S. Sieve Series), can be made by conventional techniques into extrudates, pills, pellets, or beads of the desired size. The particles of Component A and Component B can be thoroughly and intimately blended by using techniques, such as mulling or ball-milling, which are well known in the art.

A suitable procedure for making such a finished catalyst comprises forming cylindrical pellets from the thoroughly blended composite by extrusion, and charging the extruded pellets into a Marumerizer, wherein the pellets are transformed into uniform-sized spheres by means of a rolling motion resulting from centrifugal force and friction.

The Marumerizer (a registered trademark) is a machine consisting of a non-movable bowl inside of which bowl is a specially machined rotating friction plate. It can be obtained from Elanco Products Company, Equipment Sales Department, a Division of Eli Lilly and Company.

It is to be understood that the use of a Marumerizer is suggested solely for illustrative purposes and is not intended to limit the scope of the present invention. Other methods known in the art can be used to form larger particles comprising a thoroughly-blended composite of smaller particles. The larger particles can be made in the shape of extrudates, pills, pellets, beads, spheres, or other shaped particles of the desired size.

The catalyst of the present invention can be used for the conversion of hydrocarbon streams. Specifically, it can be used to reform hydrocarbon streams.

Broadly, according to the process of the present invention, there is provided an improved process for reforming a hydrocarbon stream. This process comprises contacting the hydrocarbon stream under reforming conditions and in the presence of hydrogen with a catalyst which comprises a physical particle-form mixture of a Component A and a Component B, said Component A comprising one or more Group VIII noble metals and a combined halogen deposed on a refractory inorganic oxide and said Component B comprising a metal from Group IVB or Group VB of the Periodic Table of Elements and a combined halogen deposed on a refractory inorganic oxide.

Typical operating conditions of the reforming process of the present invention comprise an inlet temperature within the range of about 900° F. (482° C.) to about 1,020° F. (549° C.), a pressure within the range of about 50 psig (446 KPa) to about 1,000 psig (6,996 KPa), a weight hourly space velocity (WHSV) within the range of about 0.5 weight unit of hydrocarbon per hour per weight unit of catalyst to about 10 weight units of hydrocarbon per hour per weight unit of catalyst, and a hydrogen addition rate within the range of about 1,500 standard cubic feet per barrel [SCFB] (267 $m^3/m^3$) to about 15,000 SCFB (2,670 $m^3/m^3$). Preferred operating conditions comprise an inlet temperature within the range of about 940° F. (504° C.) to about 980° F. (527° C.), a pressure within the range of about 50 psig (446 KPa) to about 300 psig (2,170 KPa), a WHSV within the range of about 1 weight unit of hydrocarbon per hour per weight unit of catalyst to about 8 weight units of hydrocarbon per hour per weight unit of catalyst, and a hydrogen addition rate within the range of about 3,000 SCFB (534 $m^3/m^3$) to about 10,000 SCFB (1,780 $m^3/m^3$).

The process of the present invention can be carried out in any of the conventional types of equipment known to the art. One may, for example, employ catalysts in the form of pills, pellets, granules, broken fragments, or various special shapes, disposed as one or more fixed beds within one or more reaction zones, and the charging stock may be passed therethrough in the liquid, vapor, or mixed phase, and in either upward or downward flow. Alternatively, the catalyst may be in a suitable form for use in moving beds, in which the charging stock and catalyst are preferably passed in countercurrent flow; or in fluidized-solid processes, in which the charging stock is passed upward through a turbulent bed of finely-divided catalyst; or in the suspensoid process, in which the catalyst is slurried in the charging stock and the resulting mixture is conveyed into the reaction zone. A fixed-bed reforming process is exemplified by Ultraforming (PETROLEUM ENGINEER, Vol. XXVI, No. 4, April, 1954, at page C-35). The reaction products from the foregoing processes are removed from the reaction zones and fractionated to recover the various components thereof. The hydrogen and unconverted materials are recycled as desired, the excess hydrogen produced in a reformer conveniently being utilized in the hydrodesulfurization of the feed, if such hydrodesulfurization is needed.

The catalyst of the present invention is not presulfided. Hence, it has an advantage over the current platinum-rhenium catalyst, which must be presulfided to minimize initial hydrocracking.

Unwanted products in the reforming of petroleum hydrocarbon streams are light hydrocarbon gases and coke. Such products and other compounds, such as polynuclear aromatics and heavy hydrocarbons, may result in coke. As the operation progresses, a substantial amount of coke accumulates on the surface of the catalyst resulting in an increasingly rapid rate of catalyst deactivation. Consequently, the coke must be removed periodically from the surface. Such coke removal may be accomplished through a coke-burn treatment wherein the coked catalyst is contacted with an oxygen-containing gas at selected temperatures. Typically, the gas will contain oxygen within the range of about 1 vol % to about 21 vol %. The concentration of oxygen in the gas should be maintained at a level which will not result in the production of temperatures that will be in excess of 1,100° F. (593° C.), preferably, in excess of 1,050° F. (566° C.).

Typically, the process of the present invention can be employed as a semi-regenerative reforming process or as a regenerative or cyclic process. In a semi-regenerative reforming process, the flow of hydrocarbons is stopped to all of the reactors in the system and the catalyst in each of the reactors is regenerated. In a regenerative or cyclic reforming system, one of the reactors is removed from the system and is replaced by an auxiliary reactor. Reforming of hydrocarbons continues in such a system, while catalyst in the reactor that has been removed from the system is regenerated. The auxiliary reactor is known as a swing reactor.

A preferred embodiment of the process of the present invention is depicted in the accompanying FIG. 1. This figure is a simplified schematic flow diagram of the preferred embodiment. It does not include certain auxiliary equipment, such as heat exchangers, valves, pumps, compressors, and associated equipment, which would be needed in various places along the flow path of the process in addition to the pump and compressor that are depicted in the drawing. Such additional auxiliary equipment and its location requirements would be quickly recognized by one having ordinary skill in the art. Consequently, such auxiliary equipment is not shown in the figure.

In the embodiment of the process of the present invention that is represented in the accompanying FIG. 1, a naphtha having a boiling range of about 160° F. (71° C.) to about 400° F. (204° C.), preferably, about 180° F. (82° C.) to about 380° F. (193° C.), is obtained from source 10. This naphtha contains 35 ppm sulfur. However, it could satisfactorily contain sulfur in an amount within the range of 0 ppm to about 80 ppm. This feedstock is passed through line 11 into pump 12, which pumps the hydrocarbons through line 13. Hydrogen-containing recycle gas is introduced into line 13 via line 14 to be mixed with the hydrocarbons in line 13. The resulting hydrogen-hydrocarbon mixture passes through line 13, furnace 15, and line 16 into the top of reactor 17. The material is introduced into reactor 17 at a temperature of about 940° F. (504° C.) to about 980° F. (527° C.). The outlet temperature of reactor 17 is approximately 800° F. (427° C.) and the pressure in reactor 17 is within the range of about 160 psig (1,205 KPa) to about 320 psig (2,308 KPa).

The effluent from reactor 17 passes through line 18, furnace 19, and line 20 into the top of reactor 21. Sufficient heat is introduced into this hydrogen-hydrocarbon stream by furnace 19 so that the temperature at the inlet of reactor 21 is about 960° F. (516° C.) to about 1,000° F. (538° C.). The outlet temperature of reactor 21 is approximately 855° F. (457° C.) and the pressure in reactor 21 is within the range of about 140 psig (1,067 KPa) to about 300 psig (2,170 KPa).

The effluent from reactor 21 passes through line 22, furnace 23, and line 24 into the top of reactor 25. This effluent is heated in furnace 23 so that the inlet temperature of reactor 25 is about 960° F. (516° C.) to about 1,000° F. (538° C.). The outlet temperature of reactor 25 is approximately 940° F. (504° C.) and the pressure in reactor 25 is within the range of about 120 psig (929 KPa) to about 280 psig (2,032 KPa).

The effluent from reactor 25 passes through line 26, furnace 27, and line 28 into the top of reactor 29. This hydrocarbon effluent is heated in furnace 27 so that the inlet temperature of reactor 29 is about 980° F. (527° C.) to about 1,020° F. (549° C.). The outlet temperature of reactor 29 is about 950° F. (510° C.) and the pressure in reactor 29 is within the range of about 100 psig (791 KPa) to about 260 psig (1,894 KPa).

Reactors 17, 21, 25, and 29 all contain a catalyst which has not been presulfided and which comprises a physical particle-form mixture of a Component A and a Component B, said Component A comprising 1 wt % platinum and 1 wt % combined chlorine deposed on gamma-alumina and said Component B comprising 1 wt % zirconium, tantalum, or vanadium and 1 wt % combined chlorine deposed on gamma-alumina, said Component A and Component B being present in equal amounts. The particles are 1/16-inch × 1/16-inch pellets.

Not shown in the figure is a fifth reactor, which reactor contains a quantity of the catalyst that is employed in the other reactors. This additional reactor is employed as a swing reactor for each of the four reactors in this system when the catalyst in a particular reactor has become deactivated and must be regenerated. The reactor containing this deactivated catalyst is removed from the system and is replaced by the swing reactor in order that the reforming system may be operated continuously, even though the deactivated catalyst has been removed from the system and is being regenerated.

The hydrogen-to-hydrocarbon ratio and the WHSV employed in the various reactors fall within the respective ranges and values as expressed hereinabove.

The effluent from reactor 29 passes through line 30, water cooler 31, and line 32 into gas-liquid separator 33. Gas-liquid separator 33 is operated at a pressure of about 80 psig (653 KPa) to about 240 psig (1,756 KPa) and at a temperature of about 100° F. (38° C.). Liquid product is removed from separator 33 through line 34 to be sent to a suitable product recovery system from which a high-octane product is obtained. Gaseous material is removed from separator 33 through line 35. A portion of this gas is removed from the system through line 36 to be used at other refinery units. The remainder of the hydrogen-hydrocarbon gas in line 35 is compressed by compressor 37 to be sent through lines 38 and 14 as hydrogen-hydrocarbon recycle gas. When necessary, make-up hydrogen gas may be introduced into the system from source 39 via line 40.

It is contemplated that in a second embodiment of the process of the present invention, which second embodiment can be represented also by the simplified schematic flow diagram depicted in FIG. 1, two catalysts are employed. In this second embodiment. Reactors 17 and 21 contain a first catalyst, which comprises about 0.05 wt % to about 1 wt % platinum and about 0.1 wt % to about 1 wt % combined halogen, preferably, chlorine, on an alumina carrier, and Reactors 25 and 29 contain a second catalyst, which second catalyst is an embodiment of the catalyst of the process of the present invention as described hereinabove. The swing reactor (not shown) employs either the second catalyst or a mixture of the two catalysts. The operating conditions employed in this embodiment fall within the ranges of values set forth hereinabove. In this latter embodiment, either a virgin naphtha or a partially-reformed hydrocarbon stream may be employed as the hydrocarbon feedstock.

Accordingly, there is provided an improved process for the reforming of a hydrocarbon stream selected from the group consisting of naphthas and hydrocarbon fractions boiling in the gasoline boiling range, which process comprises contacting said hydrocarbon stream under reforming conditions and in the presence of hydrogen with a catalyst which comprises a physical particle-form mixture of a Component A and a Component B, said Component A comprising one or more Group VIII noble metals and a combined halogen deposed on a refractory inorganic oxide and said Component B comprising a metal from Group IVB or Group VB of the Periodic Table of Elements and a combined halogen deposed on a refractory inorganic oxide. The catalyst has not been presulfided. Detailed descriptions of the catalysts and feedstocks that can be used in this process are described hereinabove.

Moreover, there is provided, in a process for the reforming of a hydrocarbon stream selected from the group consisting of naphthas and hydrocarbon fractions boiling in the gasoline boiling range wherein said stream is contacted under reforming conditions and in the presence of hydrogen with a catalyst comprising platinum and a combined halogen on a refractory inorganic oxide, the improvement which comprises a catalyst which has not been presulfided and which comprises a physical particle-form mixture of a Component A and a Component B, said Component A comprising one or more Group VIII noble metals and a combined halogen deposed on a refractory inorganic oxide and said Component B comprising a metal from Group IVB or Group VB of the Periodic Table of Elements and a combined halogen deposed on a refractory inorganic oxide.

The following examples are presented to facilitate a better understanding of the present invention. They are presented for the purpose of illustration only and are not intended to limit the scope of the present invention. The scope of the invention is limited solely by the claims that are appended hereto.

EXAMPLE I

An embodiment of the catalyst of the present invention was prepared. This embodiment, made up of a component containing platinum and palladium, Component No. 1, and a component containing vanadium, Component No. 2, is identified hereinafter as Catalyst A.

Component No. 1 of Catalyst A was prepared by impregnating a 100-gm portion of a 20/45-mesh Aero-1000 alumina, obtained from the American Cyanamid Company, with a solution that had been prepared by dissolving 1.0 gm of chloroplatinic acid, $H_2PtCl_6$ (39.35 wt % platinum), 1.1 gm of concentrated hydrochloric acid (about 36.5% $Cl^-$), and 6.0 gm of a 10 wt % solution of palladium nitrate, $Pd(NO_3)_2$, in 120 gm of distilled water. A 20/45-mesh material is a material that will pass through a 20-mesh screen (U.S. Sieve Series) but will be retained on a 45-mesh screen (U.S. Sieve Series). The impregnated alumina was dried in air at a temperature of 250° F. (121° C.) overnight (a period of approximately 16 hours) and calcined at 1,000° F. (538° C.) for 3 hours. Unless provided otherwise in the catalyst preparations discussed hereinafter, any drying and calcination conditions are the same as these. This component was prepared to contain 0.4 wt % platinum, 0.6 wt % palladium, and 0.8 wt % combined chlorine on alumina.

Component No. 2 of Catalyst A was prepared by impregnating 50 gm of 20/45-mesh Aero-1000 alumina, obtained from the American Cyanamid Company, with a solution that had been prepared by dissolving 1.15 gm of ammonium decavanadate, $(NH_4)_6V_{10}O_{28}.6H_2O$ and 1.37 gm of concentrated hydrochloric acid in 40 gm of distilled water. This component was dried and calcined. It was analyzed to contain 1.1 wt % vanadium and 0.53 wt % combined chlorine.

Catalyst A was prepared by adding 20 gm of Component No. 1 to 10 gm of Component No. 2, each component being present as 20/45-mesh material. The resulting catalyst blend was thoroughly mixed. Catalyst A was prepared to contain 0.27 wt % platinum, 0.40 wt % palladium, 0.37 wt % vanadium, and 0.71 wt % combined chlorine.

EXAMPLE II

A catalyst of the prior art was prepared by forming a composite of four samples of commercially-prepared platinum-rhenium reforming catalysts, which had been obtained from the American Cyanamid Company. Each of the four samples used in this composite was said by the manufacturer to contain 0.37 wt % platinum and 0.37 wt % rhenium. The composite was adjusted for combined chlorine content by impregnation thereof with aqueous hydrochloric acid, dried, and calcined and the resulting impregnated composite was found to contain 0.8 wt% combined chlorine. The catalyst is identified hereinafter as Catalyst B.

EXAMPLE III

Another embodiment of the catalyst of the present invention was prepared. This embodiment, composed of a component containing platinum, Component No. 3, and a component containing vanadium, Component No. 2, is identified hereinafter as Catalyst C. Component No. 3 was obtained from the American Cyanamid Company as a catalyst containing approximately 0.4 wt % platinum and approximately 0.4 wt % combined chlorine on a gammaalumina support.

Catalyst C was prepared by mixing and thoroughly blending 20 gm of Component No. 3 with 10 gm of Component No. 2. The catalyst was obtained by blending 20/45-mesh material of Component No. 2 with 20/45-mesh material of Component No. 3. The resulting blend was prepared to contain 0.27 wt % platinum, 0.37 wt % vanadium, and 0.44 wt % combined chlorine.

EXAMPLE IV

A catalyst containing both platinum and vanadium on the same support particle was prepared. A 100-gm portion of 20/45-mesh Aero-1000 alumina, obtained from the American Cyanamid Company, was impregnated with a solution containing 2.3 gm of ammonium decavanadate, $(NH_4)_6V_{10}O_{28}.6H_2O$, in 90 gm of distilled water. The impregnated support material was then dried in air overnight. The dried, impregnated support was then impregnated with a solution containing 1.0 gm of chloroplatinic acid, $H_2PtCl_6$, and 1.6 gm of concentrated hydrochloric acid in 120 gm of distilled water. The resulting impregnated material was subsequently dried and calcined. This catalyst, hereinafter identified as Catalyst D, was found to contain 0.67 wt % platinum, 1.11 wt % vanadium, and 0.61 wt % combined chlorine.

EXAMPLE V

Each of the above-described catalysts, Catalysts A, B, C, and D, was tested in a bench-scale pilot unit for its reforming ability. Two feedstocks, Feed A and Feed B, were employed. Feed A, a desulfurized Midcontinent naphtha, was essentially free of sulfur (less than 1 ppm sulfur) while Feed B was the same naphtha containing 80 ppm sulfur, which had been introduced into the feed in the form of a mixture of thiophene and tert-butylsulfide in a 1:1 molar ratio. The properties of Feed A are presented hereinafter in Table I.

TABLE I

| PROPERTIES OF FEED A | |
|---|---|
| Gravity, °API | 55.7 |

TABLE I-continued

| PROPERTIES OF FEED A | |
|---|---|
| Specific gravity | 0.7558 |
| Sulfur, ppm | 0.7 |
| Nitrogen, ppm | 0.1 |
| Combined chlorine, ppm | 3.0 |
| Molecular weight | 110.3 |
| Hydrocarbon type, vol % | |
| Paraffins | 52.6 |
| Naphthenes | 33.2 |
| Aromatics | 14.2 |
| Research Octane Number (Clear) | 50.4 |

Each test was conducted in a bench-scale test unit employing an isothermal fixed bed of catalyst. The hydrocarbon feedstock and bottled hydrogen (once-through) were mixed and the resulting hydrogen-hydrocarbon mixture was charged to a reactor having an inside diameter of 0.622 inch. The reactor, which was 20 inches long, was immersed in a hot salt bath containing DuPont HITEC. The temperatures in the reactor were determined by employing a manually-operated concentric thermocouple, which was movable along the length of the reactor. The hydrocarbon feed was pumped by a positive-displacement Ruska pump. The liquid product was collected in a high-pressure receiver. Liquid products were weighed and analyzed on a Hewlett-Packard research chromatograph, Model 5830A. The gas yield was measured by wet test meter and analyzed with a Varian Aerograph chromatograph, Series 1200. Research octane numbers were estimated from gas chromatographic analyses through the use of a mass spectrometric-research octane number correlation (Correlation No. 1) and a correlation between gas chromatographic analyses and data obtained from Correlation No. 1.

Each catalyst was charged to a reactor in the form of 20/45-mesh material. For Test Nos. 2, 3, 6, and 7, a bed of 20 gm of catalyst was supported on a layer of 6.2 cc of 3.0 mm glass beads. For all other tests, 30 gm of catalyst were employed on the glass-bead support. Different amounts of total catalyst were employed in order to provide for the various tests a similar metal and chloride loading in the reactor.

After the reactor containing the catalyst was placed in the test unit, the catalyst was pretreated. The pretreatment comprised subjecting the catalyst to an air soak for one hour at a temperature of 930° F. (499° C.) and an air flow rate of 0.0085 ft³/hr (0.0015 m³/hr) followed by a nitrogen purge, and then reducing the catalyst with hydrogen for 1 hr at a test pressure and temperature of 930° F. (499° C.) at a hydrogen flow rate of 1.95 ft³/hr (0.35 m³/hr). For some of the catalyst, the air soak was followed by a sulfiding step prior to the hydrogen reduction. The sulfiding was conducted for 0.25 hr by means of a gas mixture comprising 8 vol% hydrogen sulfide and hydrogen at a temperature of 930° F. (499° C.) and a pressure of 400 psig (2,859 KPa).

Figure 2:
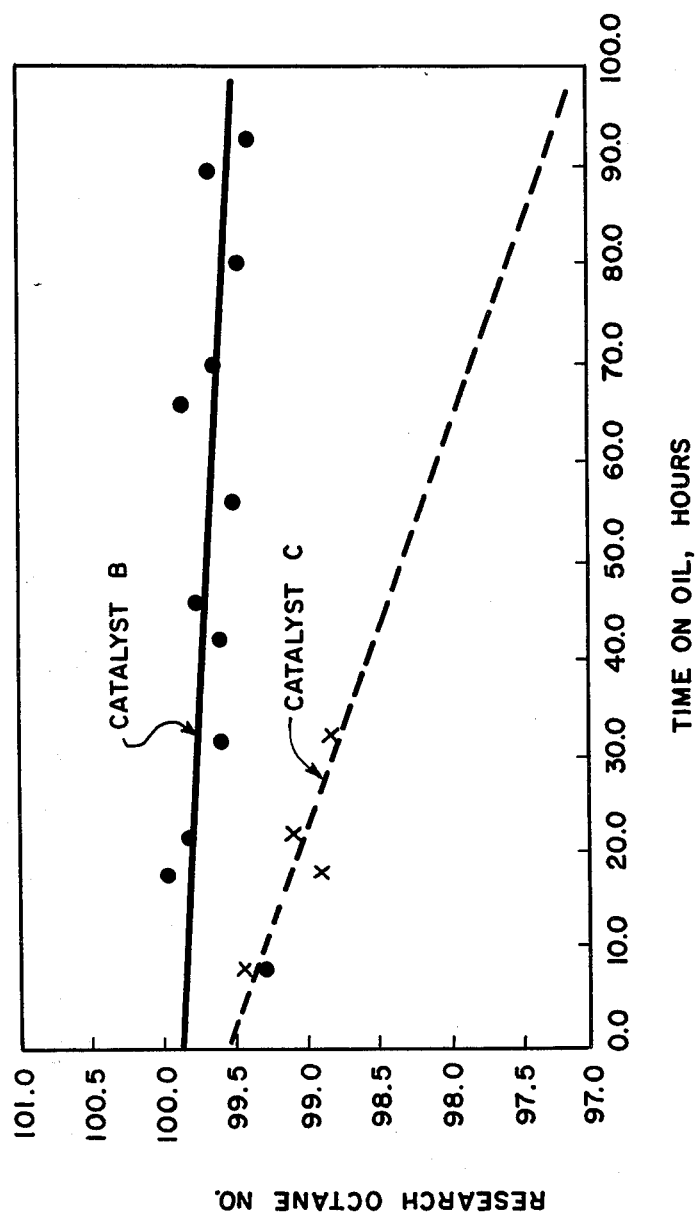
FIG. 2 shows the performance of Catalyst C (composite of a platinum-containing component and a vanadium-containing component) when it is being employed for the conversion of a low-sulfur feedstock.
Figure 3:
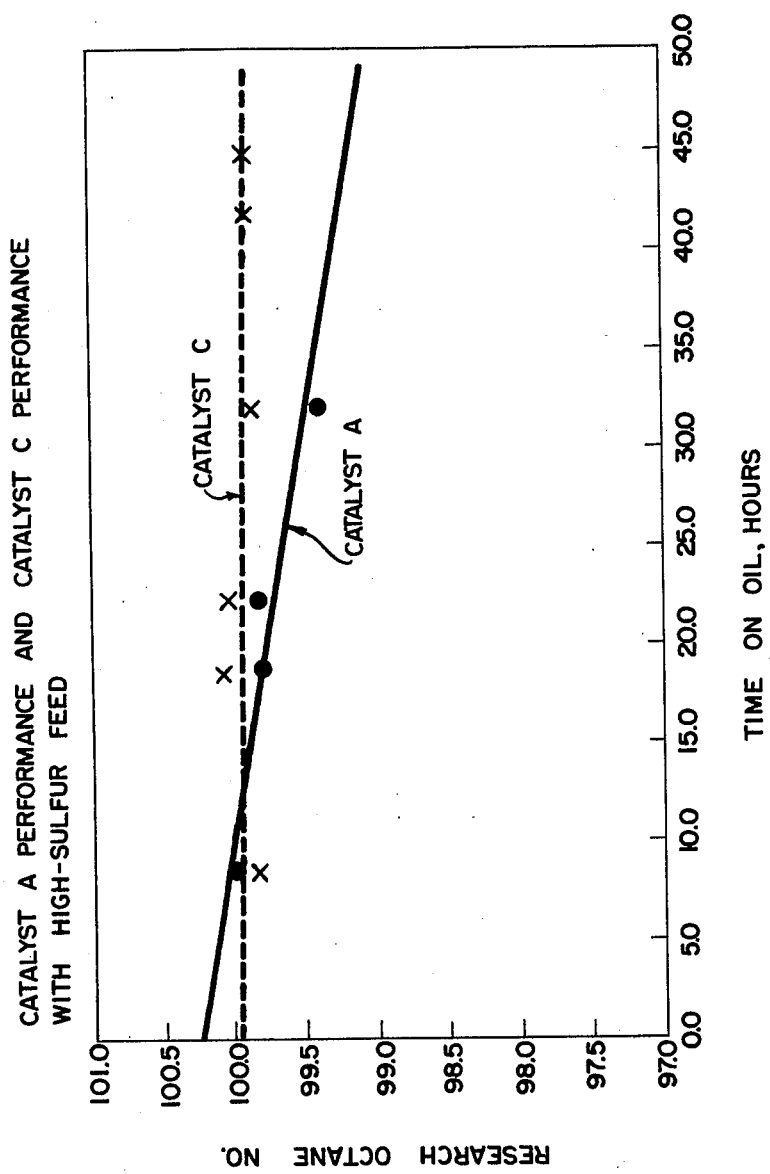
FIG. 3 presents the performances of Catalyst C and Catalyst A (composite of a platinum-palladium-containing component and a vanadium-containing component), when either catalyst is being used for the conversion of a high-sulfur feedstock.
Figure 4:
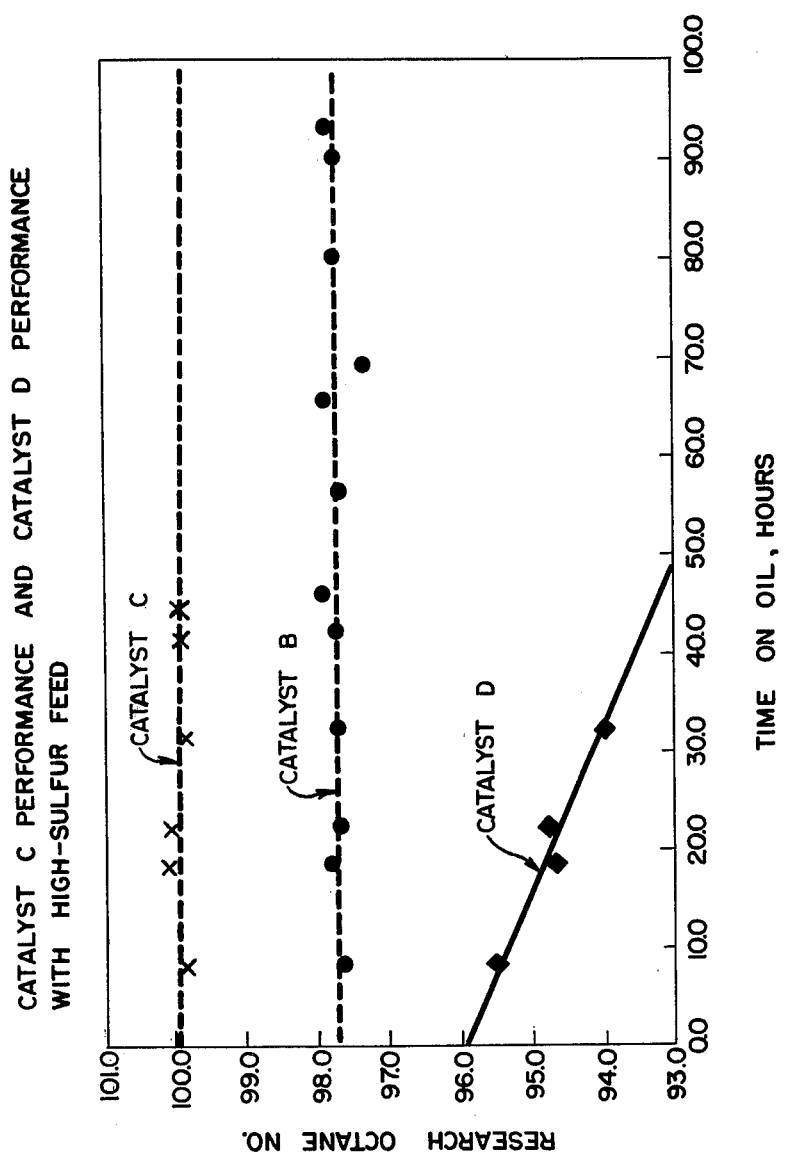
FIG. 4 depicts the performance of Catalyst C and Catalyst D (a platinum-vanadium-containing material), when either catalyst is being employed to convert a high-sulfur feedstock.
Figure 5:
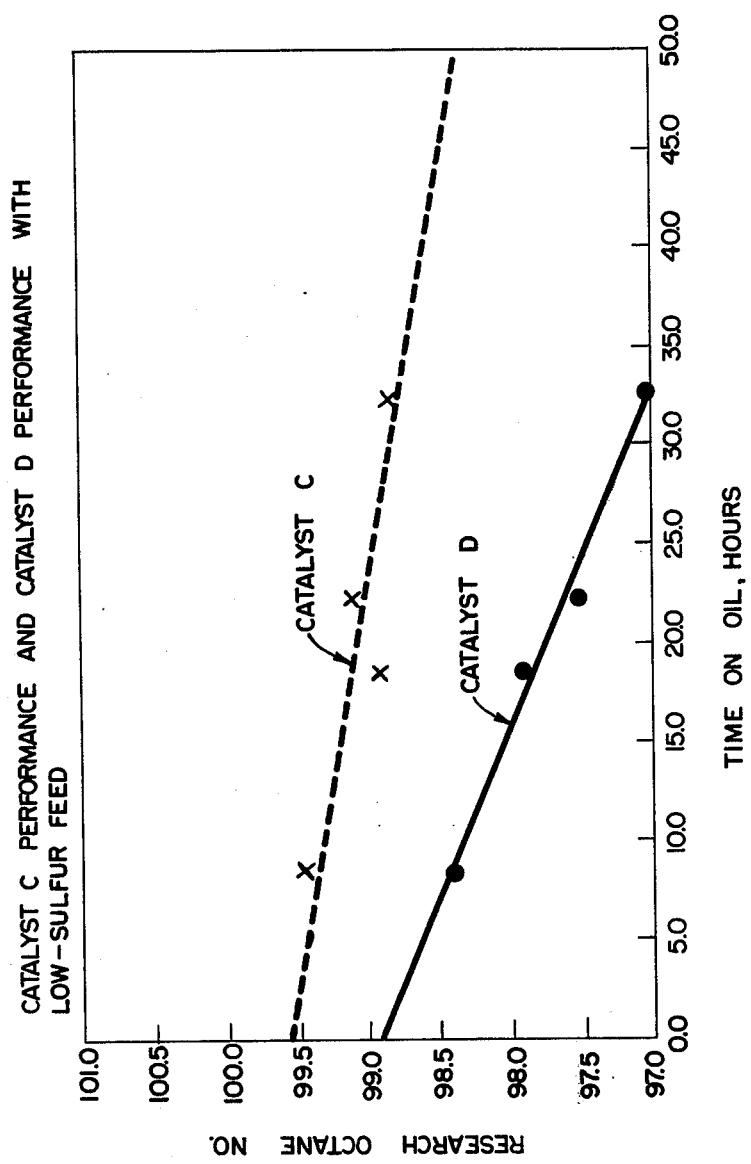
FIG. 5 presents the performances of Catalyst C and Catalyst D, when either catalyst is being used to convert a low-sulfur feedstock.
Figure 6:
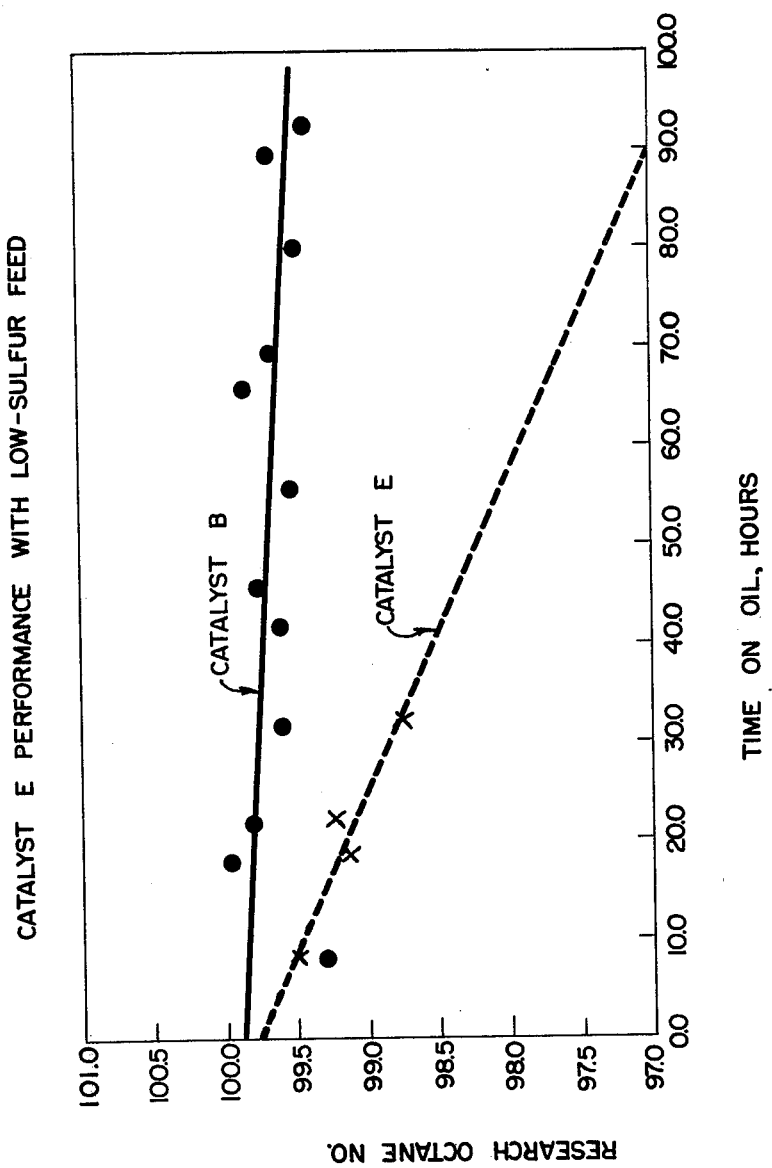
FIG. 6 shows the performance of Catalyst E (composite of a platinum-containing component and a tantalum-containing component), when it is being employed for the conversion of a low-sulfur feedstock.
Figure 7:
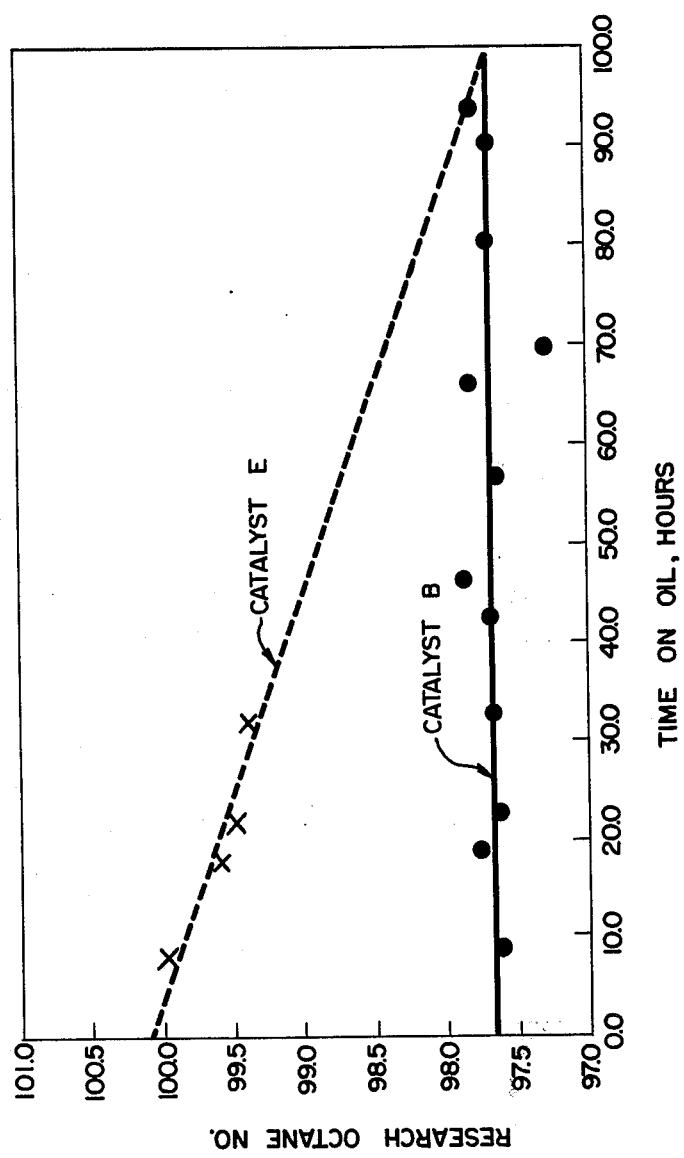
FIG. 7 presents the performance of Catalyst E, when it is employed to convert a high-sulfur feedstock.
Figure 8:
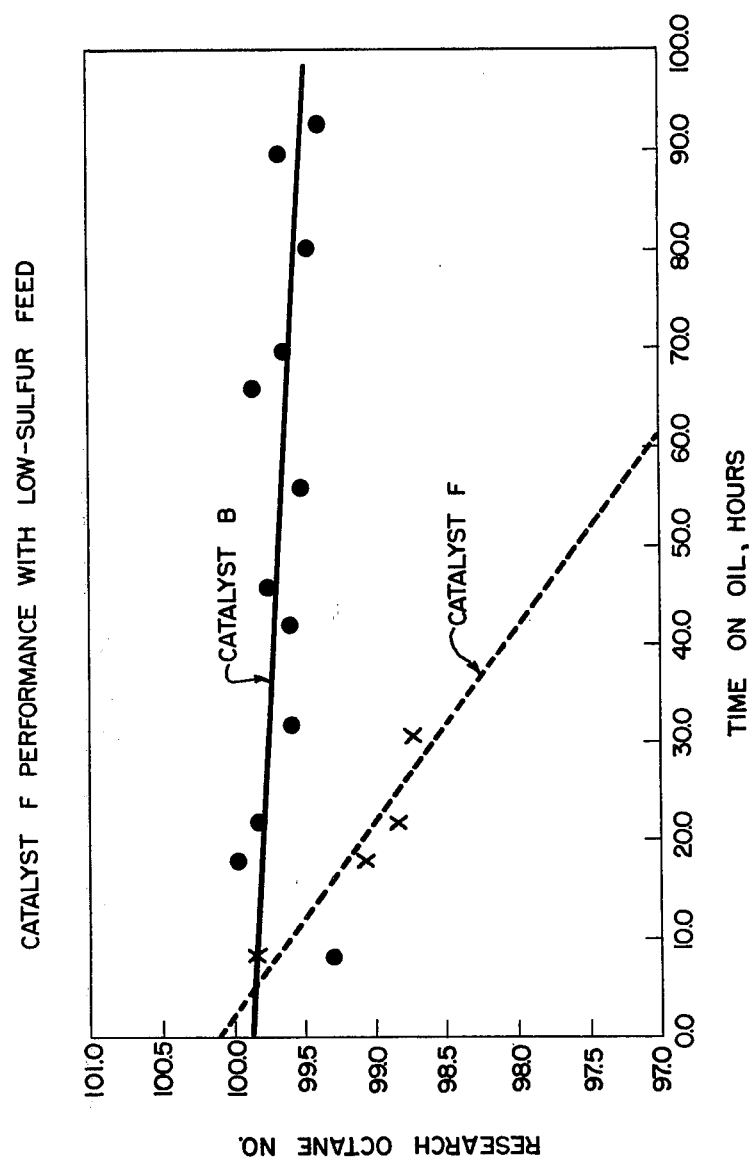
FIG. 8 presents the performance of Catalyst F (composite of a platinum-containing component and a zirconium-containing component), when it is being employed to convert a low-sulfur feedstock.
Figure 9:
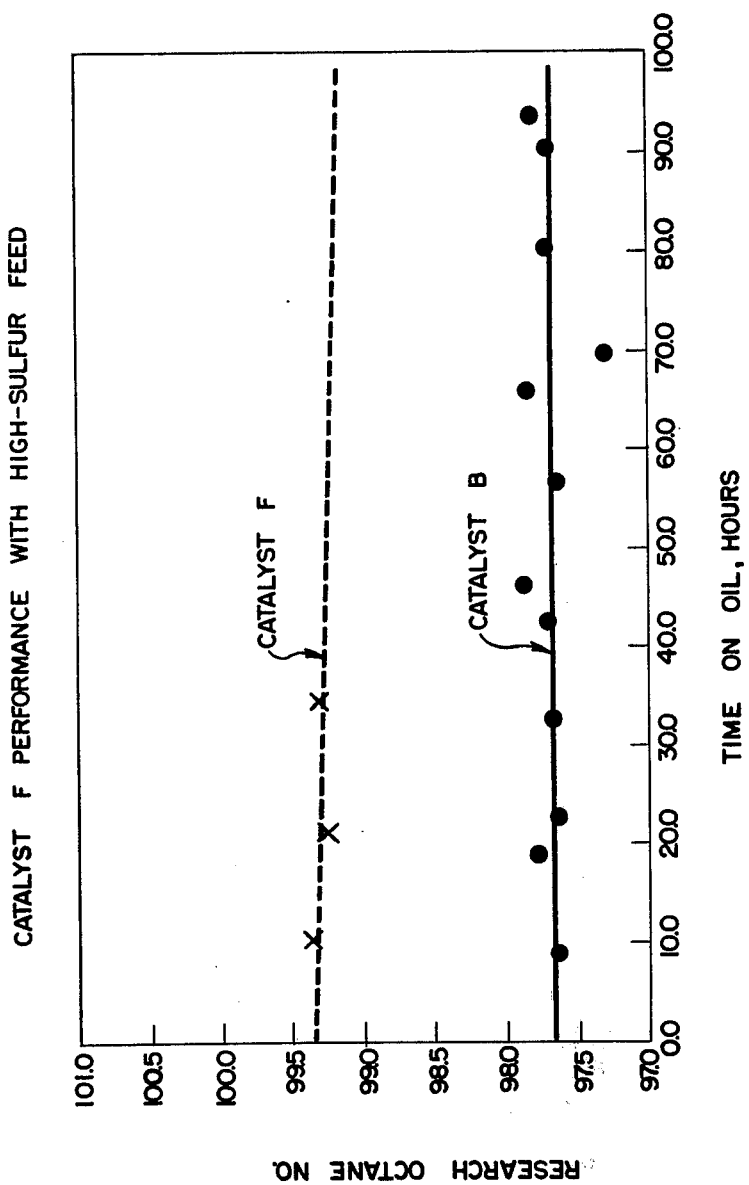
FIG. 9 shows the performance of Catalyst F, when it is employed to convert a high-sulfur feedstock.

The results of these tests are presented hereinbelow in Tables II through VIII. These results are presented in terms of the liquid product obtained from the particular test sample. The "Time on Oil" represents the time consumed during all of the preceding test periods of the given test plus half of the time of the period during which the particular sample was obtained. "Octane No." represents the Research octane number estimated by the above-described "gas chromatographic-analyses" technique. Catalyst A was tested in Test No. 1 for its ability to reform Feed B. The results obtained from Test No. 1 are presented in Table II and FIG. 3. Catalyst B was tested in Test No. 2 for its ability to reform Feed A and in Test No. 3 for its ability to reform Feed B. The results obtained from Test No. 2 are presented in Table III and FIGS. 2, 6, and 8; the results obtained from Test No. 3, in Table IV and FIGS. 4, 7, and 9. Catalyst C was tested in Test No. 4 for its ability to reform Feed A; and in Test No. 5 for its ability to reform Feed B. The results obtained from Test No. 4 are presented in Table V and FIGS. 2 and 5; the results obtained from Test No. 5, in Table VI and FIGS. 3 and 4. Catalyst D was tested in Test No. 6 for its ability to reform Feed A and in Test No. 7 for its ability to reform Feed B. The results obtained from Test No. 6 are presented in Table VII and FIG. 5; the results obtained from Test No. 7, in Table VIII and FIG. 4.

While Catalyst C, an embodiment of the catalyst of the present invention, is capable of reforming a low-sulfur feed, its performance is inferior to that of a platinum-rhenium catalyst, Catalyst B. However, Catalyst C is much superior to a platinum-rhenium catalyst when reforming a high-sulfur feed. On the other hand, Catalyst D, a catalyst which does not have different metals on different support particles, is much less active than the platinum-rhenium catalyst, when reforming the high-sulfur feedstock. Furthermore, a catalyst that is made up of a composite of a Group VIII-noble metal-containing component and a vanadium-containing component, Catalyst C, is far more active than a catalyst which contains both a Group VIII noble metal and vanadium on the same support particle, Catalyst D. In addition, a catalyst of the present invention which contains more than one Group VIII noble metal, Catalyst A, does not outperform a catalyst which contains only one Group VIII noble metal, Catalyst C.

TABLE II

| LIQUID PRODUCT FROM TEST NO. 1 CATALYST A; FEED B | | | | |
|---|---|---|---|---|
| Sample No. | 1 | 2 | 3 | 4 |
| Time on Oil, hr | 8.8 | 19.1 | 22.7 | 32.3 |
| Component, Wt % On Feed | | | | |
| Ethane | 0.0 | 0.0 | 0.0 | 0.0 |
| Propane | 0.6 | 0.4 | 0.3 | 0.6 |
| i-Butane | 0.8 | 0.7 | 0.6 | 0.8 |
| n-Butane | 1.5 | 1.3 | 1.2 | 1.5 |
| i-Pentane | 2.7 | 2.6 | 2.5 | 2.6 |
| n-Pentane | 1.8 | 1.8 | 1.7 | 1.8 |
| i-Hexane | 3.8 | 3.8 | 3.7 | 3.8 |
| n-Hexane | 1.5 | 1.5 | 1.5 | 1.6 |
| MCP | 0.5 | 0.5 | 0.5 | 0.5 |
| i-Heptane | 3.0 | 3.1 | 3.1 | 3.1 |
| n-Heptane | 0.9 | 1.0 | 1.0 | 1.0 |
| i-Octane | 1.8 | 2.0 | 2.0 | 2.1 |
| n-Octane | 0.4 | 0.4 | 0.4 | 0.5 |
| $C_9+$ Paraffins | 0.4 | 0.6 | 0.6 | 0.6 |
| Benzene | 2.4 | 2.4 | 2.4 | 2.4 |
| Toluene | 11.4 | 11.4 | 11.3 | 10.0 |
| $C_8$ Aromatics | 24.3 | 25.0 | 23.8 | 24.4 |
| $C_9+$ Aromatics | 22.8 | 23.1 | 23.0 | 22.9 |
| Totals | | | | |
| Paraffins | 19.9 | 19.8 | 19.2 | 20.5 |
| Aromatics | 60.8 | 61.9 | 60.5 | 59.7 |
| Total Yields | 80.8 | 81.7 | 79.7 | 80.2 |
| Octane No. | 100.0 | 99.8 | 99.8 | 99.4 |

TABLE III

LIQUID PRODUCT FROM TEST NO. 2
CATALYST B; FEED A

| Sample No. | 1 | 2 | 3 | 4 | 5 | 6 | 7 | 8 | 9 | 10 | 11 | 12 |
|---|---|---|---|---|---|---|---|---|---|---|---|---|
| Time on Oil, hr | 8.7 | 18.7 | 22.5 | 32.4 | 42.6 | 46.5 | 56.4 | 66.6 | 70.2 | 80.6 | 90.1 | 93.0 |
| Component, Wt % On Feed | | | | | | | | | | | | |
| Ethane | 0.0 | 0.0 | 0.0 | 0.1 | 0.0 | 0.0 | 0.0 | 0.0 | 0.0 | 0.1 | 0.0 | 0.0 |
| Propane | 0.6 | 0.4 | 0.5 | 0.7 | 0.5 | 0.4 | 0.6 | 0.4 | 0.4 | 0.6 | 0.4 | 0.6 |
| i-Butane | 0.9 | 0.7 | 0.7 | 0.8 | 0.8 | 0.7 | 0.9 | 0.7 | 0.6 | 0.8 | 0.7 | 0.7 |
| n-Butane | 1.6 | 1.5 | 1.6 | 1.7 | 1.6 | 1.5 | 1.8 | 1.5 | 1.4 | 1.6 | 1.5 | 1.6 |
| i-Pentane | 3.1 | 2.9 | 2.8 | 2.6 | 3.0 | 2.8 | 3.1 | 2.7 | 2.6 | 2.8 | 2.7 | 2.8 |
| n-Pentane | 2.1 | 2.0 | 1.9 | 2.1 | 2.0 | 1.9 | 2.1 | 1.9 | 1.8 | 1.9 | 1.9 | 1.9 |
| i-Hexane | 5.0 | 4.3 | 4.0 | 4.3 | 4.3 | 4.0 | 4.4 | 4.0 | 3.9 | 4.0 | 4.0 | 4.1 |
| n-Hexane | 1.6 | 1.6 | 1.6 | 1.7 | 1.7 | 1.6 | 1.7 | 1.6 | 1.5 | 1.6 | 1.6 | 1.6 |
| MCP | 0.6 | 0.6 | 0.5 | 0.6 | 0.5 | 0.6 | 0.6 | 0.6 | 0.5 | 0.6 | 0.6 | 0.6 |
| i-Heptane | 3.6 | 3.4 | 3.2 | 3.5 | 3.5 | 3.3 | 3.6 | 3.3 | 3.3 | 3.3 | 3.3 | 3.4 |
| n-Heptane | 1.1 | 1.0 | 1.0 | 1.1 | 1.1 | 1.0 | 1.1 | 1.0 | 1.0 | 1.0 | 1.0 | 1.0 |
| i-Octane | 2.4 | 2.4 | 1.9 | 2.1 | 2.1 | 2.00 | 2.1 | 1.9 | 2.0 | 2.0 | 1.9 | 2.1 |
| n-Octane | 0.5 | 0.4 | 0.4 | 0.4 | 0.4 | 0.4 | 0.4 | 0.4 | 0.4 | 0.4 | 0.4 | 0.4 |
| $C_9+$ Paraffins | 0.7 | 0.5 | 0.4 | 0.4 | 0.5 | 0.5 | 0.5 | 0.4 | 0.5 | 0.5 | 0.5 | 0.5 |
| Benzene | 2.6 | 2.9 | 2.7 | 2.9 | 2.9 | 2.7 | 3.0 | 2.7 | 2.7 | 2.7 | 2.7 | 2.8 |
| Toluene | 12.0 | 12.9 | 12.0 | 13.0 | 12.5 | 12.1 | 13.0 | 12.1 | 12.1 | 12.0 | 12.1 | 12.1 |
| $C_8$ Aromatics | 17.9 | 18.8 | 22.8 | 18.8 | 18.8 | 22.8 | 18.5 | 22.6 | 22.8 | 22.5 | 22.7 | 22.5 |
| $C_9+$ Aromatics | 24.0 | 23.2 | 21.5 | 23.2 | 23.2 | 21.4 | 22.8 | 21.3 | 21.4 | 21.1 | 21.2 | 21.0 |
| Totals | | | | | | | | | | | | |
| Paraffins | 24.0 | 21.4 | 20.4 | 22.1 | 22.2 | 20.4 | 23.0 | 20.2 | 20.2 | 21.2 | 20.6 | 21.3 |
| Aromatics | 56.5 | 57.8 | 59.0 | 57.9 | 57.5 | 59.1 | 57.3 | 58.8 | 59.02 | 58.4 | 58.8 | 58.3 |
| Total Yields | 80.5 | 79.3 | 79.4 | 80.0 | 79.7 | 79.5 | 80.2 | 79.0 | 79.2 | 79.6 | 79.3 | 79.6 |
| Octane No. | 99.3 | 100.0 | 99.8 | 99.6 | 99.6 | 99.8 | 99.5 | 99.8 | 99.6 | 99.5 | 99.7 | 99.4 |

TABLE IV

LIQUID PRODUCT FROM TEST NO. 3
CATALYST B; FEED B

| Sample No. | 1 | 2 | 3 | 4 | 5 | 6 | 7 | 8 | 9 | 10 | 11 | 12 |
|---|---|---|---|---|---|---|---|---|---|---|---|---|
| Time on Oil, hr | 9.1 | 19.1 | 23.0 | 33.0 | 42.9 | 46.7 | 56.9 | 66.4 | 70.0 | 80.6 | 90.8 | 94.1 |
| Component, Wt % On Feed | | | | | | | | | | | | |
| Ethane | 0.1 | 0.1 | 0.1 | 0.1 | 0.0 | 0.1 | 0.1 | 0.0 | 0.1 | 0.1 | 0.0 | 0.0 |
| Propane | 0.6 | 0.6 | 0.6 | 0.6 | 0.5 | 0.6 | 0.5 | 0.5 | 0.6 | 0.6 | 0.5 | 0.4 |
| i-Butane | 0.8 | 0.7 | 0.8 | 0.8 | 0.7 | 0.08 | 0.8 | 0.7 | 0.8 | 0.8 | 0.7 | 0.7 |
| n-Butane | 1.5 | 1.4 | 1.5 | 1.6 | 1.4 | 1.4 | 1.5 | 1.4 | 1.5 | 1.5 | 1.4 | 1.3 |
| i-Pentane | 2.6 | 2.6 | 2.6 | 2.8 | 2.5 | 2.5 | 2.6 | 2.5 | 2.7 | 2.6 | 2.6 | 2.5 |
| n-Pentane | 1.8 | 1.8 | 1.8 | 1.9 | 1.8 | 1.8 | 1.8 | 1.7 | 1.9 | 1.8 | 1.7 | 1.7 |
| i-Hexane | 3.9 | 3.9 | 3.9 | 4.2 | 3.8 | 3.8 | 3.9 | 3.8 | 4.1 | 3.8 | 3.9 | 3.9 |
| n-Hexane | 1.7 | 1.7 | 1.7 | 1.8 | 1.7 | 1.6 | 1.7 | 1.7 | 1.7 | 1.6 | 1.6 | 1.6 |
| MCP | 0.6 | 0.6 | 0.6 | 0.7 | 0.6 | 0.6 | 0.6 | 0.6 | 0.7 | 0.6 | 0.6 | 0.6 |
| i-Heptane | 3.8 | 3.8 | 3.8 | 4.0 | 3.7 | 3.7 | 3.8 | 3.7 | 4.0 | 3.7 | 3.7 | 3.7 |
| n-Heptane | 1.2 | 1.2 | 1.2 | 1.2 | 1.1 | 1.1 | 1.2 | 1.1 | 1.3 | 1.1 | 1.2 | 1.2 |
| i-Octane | 3.2 | 3.1 | 3.1 | 3.2 | 3.1 | 3.0 | 3.1 | 3.0 | 3.5 | 3.1 | 3.2 | 3.2 |
| n-Octane | 0.6 | 0.6 | 0.6 | 0.6 | 0.6 | 0.6 | 0.6 | 0.6 | 0.7 | 0.6 | 0.6 | 0.6 |
| $C_9+$ Paraffins | 1.4 | 1.4 | 1.4 | 1.5 | 1.4 | 1.3 | 1.5 | 1.4 | 1.8 | 1.5 | 1.6 | 1.6 |
| Benzene | 2.0 | 2.0 | 2.0 | 2.1 | 2.0 | 2.0 | 2.1 | 2.1 | 2.4 | 2.1 | 2.3 | 2.3 |
| Toluene | 10.2 | 10.2 | 10.1 | 10.9 | 10.2 | 10.2 | 10.3 | 10.4 | 11.5 | 10.3 | 11.0 | 11.2 |
| $C_8$ Aromatics | 23.7 | 23.1 | 23.7 | 21.2 | 24.5 | 23.3 | 23.6 | 24.4 | 21.3 | 23.8 | 21.3 | 21.3 |
| $C_9+$ Aromatics | 21.5 | 21.4 | 21.2 | 22.4 | 21.1 | 21.2 | 21.6 | 21.6 | 22.3 | 22.1 | 22.7 | 22.8 |
| Totals | | | | | | | | | | | | |
| Paraffins | 23.8 | 23.4 | 23.7 | 25.0 | 23.1 | 22.8 | 23.7 | 22.8 | 25.2 | 23.4 | 23.5 | 23.1 |
| Aromatics | 57.4 | 56.8 | 57.0 | 56.6 | 57.8 | 56.7 | 57.6 | 58.6 | 57.5 | 58.2 | 57.3 | 57.7 |
| Total Yields | 81.2 | 80.2 | 80.7 | 81.6 | 80.8 | 79.5 | 81.3 | 81.3 | 82.6 | 81.6 | 80.7 | 80.7 |
| Octane No. | 97.9 | 97.8 | 97.6 | 97.7 | 97.7 | 97.9 | 97.6 | 97.8 | 97.3 | 97.7 | 97.7 | 97.8 |

TABLE V

LIQUID PRODUCT FROM TEST NO. 4
CATALYST C; FEED A

| Sample No. | 1 | 2 | 3 | 4 |
|---|---|---|---|---|
| Time on Oil, hr | 8.9 | 18.8 | 22.6 | 32.6 |
| Component, Wt % On Feed | | | | |
| Ethane | 0.0 | 0.0 | 0.0 | 0.0 |
| Propane | 0.5 | 0.5 | 0.5 | 0.4 |
| i-Butane | 0.7 | 0.7 | 0.7 | 0.6 |
| n-Butane | 1.4 | 1.4 | 1.3 | 1.1 |
| i-Pentane | 2.5 | 2.5 | 2.4 | 2.2 |
| n-Pentane | 1.7 | 1.7 | 1.6 | 1.4 |
| i-Hexane | 3.9 | 3.9 | 3.7 | 3.5 |
| n-Hexane | 1.6 | 1.6 | 1.5 | 1.4 |
| MCP | 0.6 | 0.6 | 0.6 | 0.5 |
| i-Heptane | 3.5 | 3.6 | 3.3 | 3.4 |
| n-Heptane | 1.1 | 1.1 | 1.0 | 1.2 |
| i-Octane | 2.2 | 2.5 | 2.3 | 2.7 |
| n-Octane | 0.5 | 0.6 | 0.5 | 0.6 |
| $C_9+$ Paraffins | 0.5 | 0.8 | 0.7 | 1.0 |
| Benzene | 2.6 | 2.4 | 2.3 | 2.2 |
| Toluene | 12.1 | 11.7 | 11.0 | 11.5 |
| $C_8$ Aromatics | 23.0 | 22.6 | 25.8 | 23.6 |
| $C_9+$ Aromatics | 22.0 | 22.5 | 21.6 | 23.8 |
| Totals | | | | |
| Paraffins | 20.9 | 21.4 | 20.3 | 20.0 |
| Aromatics | 59.6 | 59.2 | 60.7 | 61.1 |
| Total Yields | 80.4 | 80.6 | 81.0 | 81.1 |

TABLE V-continued

LIQUID PRODUCT FROM TEST NO. 4
CATALYST C; FEED A

| Sample No. | 1 | 2 | 3 | 4 |
|---|---|---|---|---|
| Octane No. | 99.4 | 98.9 | 99.1 | 98.8 |

TABLE VI

LIQUID PRODUCT FROM TEST NO. 5
CATALYST C; FEED B

| Sample No. | 1 | 2 | 3 | 4 | 5 | 6 |
|---|---|---|---|---|---|---|
| Time on Oil, hr | 8.7 | 18.9 | 22.7 | 32.4 | 42.1 | 45.2 |
| Component, Wt % On Feed | | | | | | |
| Ethane | 0.0 | 0.0 | 0.0 | 0.0 | 0.0 | 0.0 |
| Propane | 0.5 | 0.2 | 0.2 | 0.5 | 0.5 | 0.2 |
| i-Butane | 0.7 | 0.6 | 0.6 | 0.7 | 0.7 | 0.5 |
| n-Butane | 1.3 | 1.2 | 1.2 | 1.4 | 1.4 | 1.1 |
| i-Pentane | 2.5 | 2.5 | 2.4 | 2.6 | 2.5 | 2.4 |
| n-Pentane | 1.6 | 1.6 | 1.6 | 1.7 | 1.7 | 1.6 |
| i-Hexane | 3.7 | 3.8 | 3.7 | 3.7 | 3.8 | 3.7 |
| n-Hexane | 1.5 | 1.5 | 1.5 | 1.5 | 1.5 | 1.5 |
| MCP | 0.5 | 0.6 | 0.5 | 0.5 | 0.6 | 0.5 |
| i-Heptane | 3.2 | 3.2 | 3.1 | 3.1 | 3.2 | 3.2 |
| n-Heptane | 1.0 | 1.0 | 1.0 | 1.0 | 1.0 | 1.0 |
| i-Octane | 2.0 | 2.0 | 1.9 | 2.0 | 2.1 | 2.1 |
| n-Octane | 0.5 | 0.5 | 0.4 | 0.4 | 0.5 | 0.5 |
| $C_9+$ Paraffins | 0.5 | 0.4 | 0.4 | 0.5 | 0.5 | 0.5 |
| Benzene | 2.3 | 2.4 | 2.4 | 2.3 | 2.4 | 2.4 |
| Toluene | 11.2 | 11.9 | 11.4 | 11.2 | 11.7 | 11.7 |
| $C_8$ Aromatics | 25.7 | 23.5 | 24.7 | 25.8 | 23.1 | 24.3 |
| $C_9+$ Aromatics | 22.8 | 23.9 | 22.8 | 22.6 | 23.7 | 23.6 |
| Totals | | | | | | |
| Paraffins | 19.5 | 19.0 | 18.6 | 19.7 | 20.0 | 19.0 |
| Aromatics | 62.0 | 61.7 | 61.4 | 61.9 | 60.8 | 62.0 |
| Total Yields | 81.5 | 80.7 | 79.9 | 81.6 | 80.8 | 81.0 |
| Octane No. | 99.8 | 100.0 | 100.0 | 99.8 | 99.9 | 99.9 |

TABLE VII

LIQUID PRODUCT FROM TEST NO. 6
CATALYST D; FEED A

| Sample No. | 1 | 2 | 3 | 4 |
|---|---|---|---|---|
| Time on Oil, hr | 8.7 | 18.8 | 22.6 | 32.6 |
| Component, Wt % On Feed | | | | |
| Ethane | 0.1 | 0.1 | 0.1 | 0.0 |
| Propane | 0.7 | 0.6 | 0.7 | 0.5 |
| i-Butane | 0.9 | 0.8 | 0.9 | 0.7 |
| n-Butane | 1.7 | 1.5 | 1.7 | 1.3 |
| i-Pentane | 3.0 | 2.7 | 3.0 | 2.5 |
| n-Pentane | 2.0 | 1.7 | 1.8 | 1.5 |
| i-Hexane | 4.6 | 4.1 | 4.5 | 4.0 |
| n-Hexane | 1.7 | 1.6 | 1.7 | 1.5 |
| MCP | 0.7 | 0.7 | 0.8 | 0.8 |
| i-Heptane | 3.7 | 3.7 | 4.1 | 3.9 |
| n-Heptane | 1.2 | 1.2 | 1.3 | 1.3 |
| i-Octane | 2.4 | 2.8 | 3.2 | 3.5 |
| n-Octane | 0.6 | 0.7 | 0.7 | 0.8 |
| $C_9+$ Paraffins | 0.7 | 1.0 | 1.2 | 1.7 |
| Benzene | 3.2 | 2.7 | 2.8 | 2.6 |
| Toluene | 12.7 | 11.5 | 12.2 | 11.3 |
| $C_8$ Aromatics | 21.0 | 23.9 | 21.0 | 23.9 |
| $C_9+$ Aromatics | 18.2 | 18.9 | 20.1 | 20.1 |
| Totals | | | | |
| Paraffins | 23.9 | 23.1 | 25.6 | 24.1 |
| Aromatics | 55.2 | 56.9 | 56.1 | 57.8 |
| Total Yields | 79.1 | 80.0 | 81.7 | 81.9 |
| Octane No. | 98.4 | 97.9 | 97.5 | 97.0 |

TABLE VIII

LIQUID PRODUCT FROM TEST NO. 7
CATALYST D; FEED B

| Sample No. | 1 | 2 | 3 | 4 |
|---|---|---|---|---|
| Time on Oil, hr | 8.6 | 18.7 | 22.5 | 32.5 |
| Component, Wt % on Feed | | | | |
| Ethane | 0.1 | 0.1 | 0.1 | 0.1 |
| Propane | 0.6 | 0.6 | 0.6 | 0.6 |
| i-Butane | 0.8 | 0.8 | 0.8 | 0.7 |
| n-Butane | 1.6 | 1.6 | 1.6 | 1.5 |
| i-Pentane | 2.7 | 2.6 | 2.6 | 2.4 |
| n-Pentane | 1.9 | 1.9 | 1.9 | 1.9 |
| i-Hexane | 4.2 | 4.0 | 4.1 | 3.8 |
| n-Hexane | 1.8 | 1.8 | 1.8 | 1.9 |
| MCP | 1.0 | 1.0 | 1.0 | 1.1 |
| i-Heptane | 4.4 | 4.4 | 4.5 | 4.5 |
| n-Heptane | 1.5 | 1.6 | 1.6 | 1.7 |
| i-Octane | 4.4 | 4.7 | 4.6 | 4.9 |
| n-Octane | 1.0 | 1.1 | 1.1 | 1.3 |
| $C_9+$ Paraffins | 2.7 | 3.1 | 3.2 | 3.7 |
| Benzene | 2.2 | 2.0 | 2.1 | 1.9 |
| Toluene | 11.0 | 10.3 | 10.6 | 10.0 |
| $C_8$ Aromatics | 20.3 | 21.2 | 19.6 | 22.5 |
| $C_9+$ Aromatics | 20.2 | 18.7 | 19.4 | 18.2 |
| Totals | | | | |
| Paraffins | 28.9 | 29.4 | 29.5 | 29.9 |
| Aromatics | 53.7 | 52.3 | 51.6 | 52.6 |
| Total Yields | 82.6 | 81.7 | 81.1 | 82.5 |
| Octane No. | 95.5 | 94.7 | 94.8 | 94.0 |

EXAMPLE VI

A new component for catalysts, Component No. 4, was prepared. This component contained tantalum in combined form on a gamma-alumina support.

It was prepared by impregnating 50 gm of Aero-1000 alumina, obtained from the American Cyanamid Company, in the form of 20/45-mesh material with a solution that had been prepared by dissolving 1.0 gm of $TaCl_5$ (tantalum pentachloride) in 55 cc of methanol. The impregnated material was dried and calcined. It was prepared to contain 1 wt % tantalum and was found to contain 0.72 wt % combined chlorine.

A 10-gm portion of this component, Component No. 4, was mixed with 20 gm of Component No. 3 to form another embodiment of the catalyst of the present invention, this embodiment being hereinafter identified as Catalyst E. This embodiment was composed of a component containing tantalum, Component No. 4, and a component containing platinum, Component No. 3.

A second 30-gm portion of Catalyst E was prepared as described hereinabove.

EXAMPLE VII

Catalyst E was tested in bench-scale pilot units that have been described hereinabove for its reforming ability. Catalyst E was tested in Test No. 8 for its ability to reform Feed A and in Test No. 9 for its ability to reform Feed B. The results obtained from Test No. 8 are presented in Table IX and FIG. 6; the results obtained from Test No. 9, in Table X and FIG. 7.

TABLE IX

LIQUID PRODUCT FROM TEST NO. 8
CATALYST E; FEED A

| Sample No. | 1 | 2 | 3 | 4 |
|---|---|---|---|---|
| Time on Oil, hr | 8.9 | 19.2 | 22.8 | 32.7 |
| Component, Wt % On Feed | | | | |
| Ethane | 0.1 | 0.0 | 0.0 | 0.1 |
| Propane | 0.6 | 0.4 | 0.4 | 0.6 |
| i-Butane | 0.8 | 0.7 | 0.7 | 0.7 |
| n-Butane | 1.5 | 1.4 | 1.4 | 1.4 |
| i-Pentane | 2.8 | 2.7 | 2.8 | 2.5 |
| n-Pentane | 2.0 | 1.9 | 1.9 | 1.7 |

TABLE IX-continued

LIQUID PRODUCT FROM TEST NO. 8
CATALYST E; FEED A

| Sample No. | 1 | 2 | 3 | 4 |
|---|---|---|---|---|
| i-Hexane | 4.2 | 4.2 | 4.2 | 3.8 |
| n-Hexane | 1.7 | 1.7 | 1.7 | 1.5 |
| MCP | 0.6 | 0.5 | 0.6 | 0.6 |
| i-Heptane | 3.5 | 3.7 | 3.7 | 3.3 |
| n-Heptane | 1.1 | 1.1 | 1.1 | 1.0 |
| i-Octane | 2.2 | 2.5 | 2.6 | 2.9 |
| n-Octane | 0.4 | 0.5 | 0.5 | 0.5 |
| $C_9+$ Paraffins | 0.6 | 0.9 | 0.8 | 0.8 |
| Benzene | 3.4 | 3.1 | 3.1 | 2.5 |
| Toluene | 13.8 | 13.1 | 13.2 | 11.5 |
| $C_8$ Aromatics | 18.2 | 18.0 | 18.3 | 23.8 |
| $C_9+$ Aromatics | 21.7 | 23.2 | 23.8 | 21.2 |
| Totals | | | | |
| Paraffins | 22.0 | 22.2 | 22.4 | 21.2 |
| Aromatics | 57.1 | 57.4 | 58.4 | 59.1 |
| Total Yields | 79.2 | 79.6 | 80.8 | 80.2 |
| Octane No. | 99.5 | 99.1 | 99.2 | 98.7 |

TABLE X

LIQUID PRODUCT FROM TEST NO. 9
CATALYST E; FEED B

| Sample No. | 1 | 2 | 3 | 4 |
|---|---|---|---|---|
| Time on Oil, hr | 8.7 | 18.6 | 22.4 | 32.5 |
| Component, Wt % On Feed | | | | |
| Ethane | 0.0 | 0.0 | 0.0 | 0.0 |
| Propane | 0.5 | 0.5 | 0.5 | 0.5 |
| i-Butane | 0.7 | 0.7 | 0.7 | 0.7 |
| n-Butane | 1.3 | 1.2 | 1.2 | 1.3 |
| i-Pentane | 2.4 | 2.4 | 2.4 | 2.5 |
| n-Pentane | 1.6 | 1.5 | 1.5 | 1.6 |
| i-Hexane | 3.6 | 3.5 | 3.6 | 3.6 |
| n-Hexane | 1.4 | 1.4 | 1.4 | 1.4 |
| MCP | 0.5 | 0.5 | 0.5 | 0.5 |
| i-Heptane | 3.2 | 3.2 | 3.3 | 3.3 |
| n-Heptane | 1.0 | 1.0 | 1.0 | 1.0 |
| i-Octane | 2.1 | 2.3 | 2.3 | 2.3 |
| n-Octane | 0.5 | 0.5 | 0.5 | 0.5 |
| $C_9+$ Paraffins | 0.5 | 0.6 | 0.7 | 0.7 |
| Benzene | 2.2 | 2.1 | 2.1 | 2.2 |
| Toluene | 11.2 | 10.8 | 10.7 | 10.9 |
| $C_8$ Aromatics | 25.7 | 25.7 | 24.8 | 25.2 |
| $C_9+$ Aromatics | 24.0 | 24.2 | 23.7 | 23.9 |
| Totals | | | | |
| Paraffins | 19.3 | 19.4 | 19.7 | 20.1 |
| Aromatics | 63.0 | 62.9 | 61.3 | 62.2 |
| Total Yields | 82.3 | 82.3 | 81.0 | 82.3 |
| Octane No. | 99.9 | 99.6 | 99.5 | 99.4 |

While Catalyst E, the composite of a platinum-containing component and a tantalum-containing component, is capable of converting a low-sulfur feed, its performance is inferior to that of Catalyst B, a conventional platinum-rhenium reforming catalyst. However, when reforming a high-sulfur feed, its performance is far superior to that of the conventional platinum-rhenium reforming catalyst.

EXAMPLE VIII

Another component for the improved catalysts of the present invention was prepared. This component, Component No. 5, contained zirconium in combined form on a gamma-alumina support.

This new component was prepared by impregnating a 50-gm portion of Aero-1000 alumina, obtained from the American Cyanamid Company, in the form of 20/45-mesh material with a solution that had been prepared by dissolving 1.35 gm of $ZrO(C_2H_3O_2)_2$, zirconyl acetate (37% zirconium), and 1.37 gm of concentrated hydrochloric acid in 45 gm of distilled water. The impregnated material was dried and calcined. This catalytic material, Component No. 5, was prepared to contain 1.0 wt % zirconium and 1.0 wt % combined chlorine.

A 10-gm portion of Component No. 5 was mixed with 20 gm of Component No. 3. This blend is hereinafter identified as Catalyst F.

A second 30-gm portion of Catalyst F was prepared as described hereinabove.

EXAMPLE IX

Catalyst F was tested in bench-scale pilot units that have been described hereinabove. It was tested in Test No. 10 for its ability to reform Feed A and in Test No. 11 for its ability to reform Feed B. The results obtained from Test No. 10 are presented in Table XI and FIG. 8; the results obtained from Test No. 11, in Table XII and FIG. 9.

TABLE XI

LIQUID PRODUCT FROM TEST NO. 10
CATALYST F; FEED A

| Sample No. | 1 | 2 | 3 | 4 |
|---|---|---|---|---|
| Time on Oil, hr | 8.8 | 18.6 | 22.4 | 31.1 |
| Component, Wt % Feed | | | | |
| Ethane | 0.1 | 0.1 | 0.1 | 0.1 |
| Propane | 0.6 | 0.6 | 0.6 | 0.6 |
| i-Butane | 0.8 | 0.7 | 0.8 | 0.7 |
| n-Butane | 1.6 | 1.4 | 1.5 | 1.4 |
| i-Pentane | 2.8 | 2.7 | 2.8 | 2.6 |
| n-Pentane | 1.9 | 1.8 | 1.9 | 1.8 |
| i-Hexane | 4.2 | 4.0 | 4.3 | 5.1 |
| n-Hexane | 1.7 | 1.6 | 1.7 | 1.5 |
| MCP | 0.6 | 0.6 | 0.6 | 0.6 |
| i-Heptane | 3.4 | 3.4 | 3.7 | 3.4 |
| n-Heptane | 1.0 | 1.0 | 1.1 | 1.0 |
| i-Octane | 1.9 | 2.3 | 2.6 | 2.5 |
| n-Octane | 0.4 | 0.5 | 0.5 | 0.5 |
| $C_9+$ Paraffins | 0.5 | 0.9 | 1.0 | 1.0 |
| Benzene | 3.3 | 2.9 | 3.0 | 2.6 |
| Toluene | 13.6 | 12.1 | 12.7 | 11.2 |
| $C_8$ Aromatics | 17.9 | 21.7 | 17.5 | 20.7 |
| $C_9+$ Aromatics | 21.7 | 21.5 | 23.2 | 21.2 |
| Totals | | | | |
| Paraffins | 21.4 | 21.4 | 23.3 | 22.8 |
| Aromatics | 56.5 | 58.2 | 56.4 | 55.8 |
| Total Yields | 77.9 | 79.6 | 79.7 | 78.6 |
| Octane No. | 99.8 | 99.1 | 98.8 | 98.7 |

TABLE XII

LIQUID PRODUCT FROM TEST NO. 11
CATALYST F; FEED B

| Sample No. | 1 | 2 | 3 | 4 |
|---|---|---|---|---|
| Time on Oil, hr | 11.2 | 21.9 | 25.7 | 35.3 |
| Component, Wt % on Feed | | | | |
| Ethane | 0.1 | 0.1 | 0.0 | 0.1 |
| Propane | 0.6 | 0.5 | 0.5 | 0.6 |
| i-Butane | 0.8 | 0.7 | 0.6 | 0.8 |
| n-Butane | 1.5 | 1.3 | 1.2 | 1.5 |
| i-Pentane | 2.8 | 2.5 | 2.4 | 2.8 |
| n-Pentane | 1.8 | 1.7 | 1.5 | 1.8 |
| i-Hexane | 4.1 | 3.7 | 3.4 | 4.1 |
| n-Hexane | 1.6 | 1.4 | 1.3 | 1.6 |
| MCP | 0.6 | 0.6 | 0.5 | 0.6 |
| i-Heptane | 3.7 | 3.4 | 3.2 | 3.7 |
| n-Heptane | 1.1 | 1.0 | 1.0 | 1.1 |
| i-Octane | 2.6 | 2.5 | 2.3 | 2.6 |
| n-Octane | 0.5 | 0.5 | 0.5 | 0.6 |
| $C_9+$ Paraffins | 0.8 | 0.9 | 0.8 | 0.9 |
| Benzene | 2.6 | 2.4 | 2.2 | 2.6 |
| Toluene | 12.0 | 10.9 | 20.1 | 11.9 |
| $C_8$ Aromatics | 18.3 | 22.4 | 15.8 | 18.3 |
| $C_9+$ Aromatics | 26.2 | 24.6 | 23.1 | 26.8 |
| Totals | | | | |
| Paraffins | 22.6 | 20.7 | 19.4 | 22.6 |
| Aromatics | 59.1 | 60.2 | 61.2 | 59.7 |

TABLE XII-continued

LIQUID PRODUCT FROM TEST NO. 11
CATALYST F; FEED B

| Sample No. | 1 | 2 | 3 | 4 |
|---|---|---|---|---|
| Total Yields | 81.7 | 81.0 | 80.6 | 82.3 |
| Octane No. | 99.4 | 99.2 | 100.7 | 99.3 |

While Catalyst F, the composite of a platinum-containing component and a zirconium-containing component, is capable of converting a low-sulfur feed, its performance is inferior to that of a conventional platinum-rhenium reforming catalyst, Catalyst B. However, when reforming a high-sulfur feed, its performance is far superior to that of the conventional platinum-rhenium reforming catalyst.

The above examples demonstrate that the catalysts of the present invention, i.e., the catalysts comprising a physical particle-form mixture of a Component A and a Component B, said Component A comprising one or more Group VIII noble metals and a combined halogen deposed on a refractory inorganic oxide and said Component B comprising a metal from Group IVB or Group VB of the Periodic Table of Elements and a combined halogen deposed on a refractory inorganic oxide, are more active and selective than the conventional platinum-rhenium-alumina catalysts, when processing a high-sulfur feed, e.g., one containing 35 ppm sulfur.

The catalyst of the present invention does not require presulfiding to control the initial hydrocracking. Moreover, the catalyst that is employed in the process of the present invention performs satisfactorily when used to reform a feedstock containing a substantial amount of sulfur.

In view of the above, the process of the present invention provides an improvement over the prior art reforming process employing the conventional sulfided platinum-rhenium-alumina catalyst. No presulfiding of the catalyst is required and a feedstock containing up to 50 ppm of sulfur, or more, can be reformed by means of the process of the present invention.

What is claimed is:

1. An improved catalyst for the reforming of a hydrocarbon stream, which catalyst comprises a physical particle-form mixture of a Component A and a Component B, said Component A comprising one or more Group VIII noble metals and a combined halogen deposed on a refractory inorganic oxide and said Component B comprising a metal from Group IVB or Group VB of the Periodic Table of Elements and a combined halogen deposed on a refractory inorganic oxide.

2. The catalyst of claim 1, wherein said Group VIII noble metals are platinum and palladium.

3. The catalyst of claim 1, wherein said metal of Group IVB or Group VB of the Periodic Table of Elements is vanadium, tantalum, or zirconium, said metal being present in said catalyst in an amount within the range of about 0.3 wt % to about 2 wt %, calculated as the element and based upon the total catalyst weight.

4. The catalyst of claim 1, wherein the refractory inorganic oxide of Component A and the refractory inorganic oxide of Component B each comprises catalytically active alumina.

5. The catalyst of claim 1, wherein the sole Group VIII noble metal is platinum, said platinum being present in an amount within the range of about 0.1 wt % to about 2 wt %, calculated as the element and based upon the total catalyst weight, and said combined halogen is present in an amount within the range of about 0.1 wt % to about 2 wt %, calculated as the element and based upon the total catalyst weight.

6. The catalyst of claim 1, wherein said catalyst comprises Component A in an amount within the range of about 40 wt % to about 80 wt %, based upon the total catalyst weight.

7. The catalyst of claim 2, wherein said metal of Group IVB or Group VB of the Periodic Table of Elements is vanadium, tantalum, or zirconium, said metal being present in said catalyst in an amount within the range of about 0.3 wt % to about 2 wt %, calculated as the element and based upon the total catalyst weight.

8. The catalyst of claim 3, wherein the sole Group VIII noble metal is platinum, said platinum being present in an amount within the range of about 0.1 wt % to about 2 wt %, calculated as the element and based upon the total catalyst weight, and said combined halogen is present in an amount within the range of about 0.1 wt % to about 2 wt %, calculated as the element and based upon the total catalyst weight.

9. The catalyst of claim 3, wherein the refractory inorganic oxide of Component A and the refractory inorganic oxide of Component B each comprises catalytically active alumina.

10. The catalyst of claim 6, wherein said metal of Group IVB or Group VB of the Periodic Table of Elements is vanadium, tantalum, or zirconium, said metal being present in said catalyst in an amount within the range of about 0.3 wt % to about 2 wt %, calculated as the element and based upon the total catalyst weight.

11. The catalyst of claim 6, wherein the refractory inorganic oxide of Component A and the refractory inorganic oxide of Component B each comprises catalytically active alumina.

12. The catalyst of claim 6, wherein the sole Group VIII noble metal is platinum, said platinum being present in an amount within the range of about 0.1 wt % to about 2 wt %, calculated as the element and based upon the total catalyst weight, and said combined halogen is present in an amount within the range of about 0.1 wt % to about 2 wt %, calculated as the element and based upon the total catalyst weight.

13. The catalyst of claim 7, wherein the refractory inorganic oxide of Component A and the refractory inorganic oxide of Component B each comprises catalytically active alumina.

14. The catalyst of claim 9, wherein the sole Group VIII noble metal is platinum, said platinum being present in an amount within the range of about 0.1 wt % to about 2 wt %, calculated as the element and based upon the total catalyst weight, and said combined halogen is present in an amount within the range of about 0.1 wt % of about 2 wt %, calculated as the element and based upon the total catalyst weight.

15. The catalyst of claim 10, wherein the sole Group VIII noble metal is platinum, said platinum being present in an amount within the range of about 0.1 wt % to about 2 wt %, calculated as the element and based upon the total catalyst weight, and said combined halogen is present in an amount within the range of about 0.1 wt % to about 2 wt %, calculated as the element and based upon the total catalyst weight.

16. The catalyst of claim 10, wherein the refractory inorganic oxide of Component A and the refractory inorganic oxide of Component B each comprises catalytically active alumina.

17. The catalyst of claim 16, wherein the sole Group VIII noble metal is platinum, said platinum being present in an amount within the range of about 0.1 wt % to about 2 wt %, calculated as the element and based upon the total catalyst weight, and said combined halogen is present in an amount within the range of about 0.1 wt % to about 2 wt %, calculated as the element and based upon the total catalyst weight.

18. The catalyst of claim 17, wherein said combined halogen is chlorine.

* * * * *

UNITED STATES PATENT OFFICE
CERTIFICATE OF CORRECTION

Patent No. 4,353,814            Dated OCTOBER 12, 1982

Inventor(s) REGIS J. PELLET, RALPH J. BERTOLACINI, & DONNA L. LYSHOLM

It is certified that error appears in the above-identified patent and that said Letters Patent are hereby corrected as shown below:

| | |
|---|---|
| Column 2, line 39, | "components thereof" should be --compounds thereof--. |
| Column 4, line 8, | "sulfur," should be --sulfur.-- |
| Column 4, line 24, | "performance" should be --performances--. |
| Column 10, line 40, | "embodiment." should be --embodiment,--. |
| Column 12, line 15, | "The" should be --This--. |
| Column 12, line 27, | "gammaalumina" should be --gamma-alumina--. |
| Column 15-16, | In Table III, under Sample No. 6, for i-Octane, "2.00" should be --2.0--. |
| Column 15-16, | In Table III, under Sample No. 9, for Aromatics, "59.02" should be --59.0--. |
| Column 15-16, | In Table IV, under Sample No. 6, for i-Butane, "0.08" should be --0.7--. |
| Column 22, line 55, | "of" should be --to--. |

Signed and Sealed this

Second Day of October 1984

[SEAL]

Attest:

GERALD J. MOSSINGHOFF

*Attesting Officer*      *Commissioner of Patents and Trademarks*